US012671881B2

(12) United States Patent
Couleaud et al.

(10) Patent No.: US 12,671,881 B2
(45) Date of Patent: Jun. 30, 2026

(54) SYSTEMS, METHODS, AND COMPUTER-READABLE MEDIA FOR PERSONALIZED MEDIA CONTENT ALTERATION

(71) Applicant: Adeia Guides Inc., San Jose, CA (US)

(72) Inventors: Jean-Yves Couleaud, Mission Viejo, CA (US); Tao Chen, Palo Alto, CA (US); Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/968,042

(22) Filed: Dec. 4, 2024

(65) Prior Publication Data

US 2026/0156331 A1    Jun. 4, 2026

(51) Int. Cl.
*H04N 21/85* (2011.01)
(52) U.S. Cl.
CPC .................................. *H04N 21/85* (2013.01)
(58) Field of Classification Search
None
See application file for complete search history.

(56) References Cited

U.S. PATENT DOCUMENTS

| | | | | |
|---|---|---|---|---|
| 5,813,010 | A | * | 9/1998 | Kurano ............ G11B 20/00086 |
| 8,159,504 | B2 | | 4/2012 | Chang et al. |
| 8,683,354 | B2 | | 3/2014 | Khandelwal et al. |
| 8,863,212 | B2 | | 10/2014 | Chang et al. |
| 9,955,218 | B2 | | 4/2018 | Panchaksharaiah et al. |
| 11,055,892 | B1 | * | 7/2021 | Choi ........................ G06T 17/00 |
| 11,093,632 | B1 | * | 8/2021 | Ton-That ............... G06N 20/00 |
| 11,657,852 | B1 | * | 5/2023 | Zavesky .......... H04N 21/23418 |
| | | | | 386/278 |
| 11,944,907 | B2 | * | 4/2024 | Hirakawa ............... A63F 13/55 |
| 2006/0174264 | A1 | * | 8/2006 | Candelore .......... H04N 21/4532 |
| | | | | 725/35 |
| 2013/0274007 | A1 | | 10/2013 | Hilbert et al. |
| 2017/0255696 | A1 | * | 9/2017 | Pulitzer ............... G06F 16/9554 |
| 2019/0043474 | A1 | * | 2/2019 | Kingsbury ........... G06F 40/117 |
| 2019/0335083 | A1 | * | 10/2019 | DiGiantomasso ... H04N 23/611 |
| 2021/0042351 | A1 | * | 2/2021 | Moore .................... G06F 16/75 |

(Continued)

OTHER PUBLICATIONS

"Advanced Accent Generator for Ultra-Realistic AI Accents", PlayHT's AI Accent Generator, Retrieved on Dec. 10, 2024, pp. 1-13, Retrieved from https://play.ht/ai-accent-generator/.

(Continued)

*Primary Examiner* — Ricky Chin
(74) *Attorney, Agent, or Firm* — HG LAW LLP

(57) ABSTRACT

An appearance of a character depicted in a media asset may be altered, for example, by a trained machine learning model, based on demographic attributes of a consumer of the media asset, such as the age or ethnicity of the consumer. A character alteration rule may limit some types of alteration, for example, re-aging a character that would depict a minor in some situation. Altering the appearance of one or more characters depicted in the media asset may also entail altering the appearance of a first character based on demographics of the consumer and automatically altering the appearance of a second character based on the second character's relationship with the first character. The re-aging the second character may be proportional to the re-aging of the first character.

20 Claims, 10 Drawing Sheets

(56) References Cited

U.S. PATENT DOCUMENTS

| | | | | |
|---|---|---|---|---|
| 2021/0056816 A1* | 2/2021 | Kotani | ................ | G07F 17/3209 |
| 2021/0183124 A1* | 6/2021 | Benditte-Klepetko | ...................... | A61B 5/167 |
| 2021/0352369 A1* | 11/2021 | Savage | ................ | G11B 27/031 |
| 2023/0053308 A1* | 2/2023 | Zavesky | ................ | G06V 40/20 |
| 2023/0080639 A1* | 3/2023 | Zoss | ......................... | G06T 5/60 382/100 |
| 2023/0109377 A1* | 4/2023 | Arechiga | ............... | G06N 5/047 345/419 |
| 2023/0114980 A1* | 4/2023 | Gupta | .................. | G06V 40/161 382/118 |
| 2023/0281461 A1* | 9/2023 | Woo | ..................... | G06N 3/0464 706/25 |
| 2023/0282243 A1* | 9/2023 | Moore | ................ | G11B 27/031 386/278 |
| 2023/0319223 A1* | 10/2023 | Naruniec | ............... | H04N 5/272 348/239 |
| 2023/0351254 A1* | 11/2023 | Gelfenbeyn | ........... | G06N 20/00 |
| 2024/0078726 A1* | 3/2024 | Weber | .................. | G06V 40/172 |
| 2024/0282303 A1* | 8/2024 | Shenkan | .................. | G10L 15/26 |
| 2024/0282428 A1* | 8/2024 | Seth | ........................ | G16H 50/20 |
| 2024/0348747 A1* | 10/2024 | Chatterjee | ................ | H04N 7/15 |
| 2024/0394929 A1* | 11/2024 | Li | .............................. | G06T 7/11 |
| 2024/0428482 A1* | 12/2024 | Khodadadeh | ........... | G06T 11/00 |
| 2025/0078873 A1* | 3/2025 | Fard | ......................... | G06T 13/00 |
| 2025/0111664 A1* | 4/2025 | Couleaud | ............... | G06V 20/30 |
| 2025/0211940 A1* | 6/2025 | Pulitzer | ............... | G06F 16/9554 |
| 2025/0265426 A1* | 8/2025 | Gagliano | .............. | H04N 21/84 |
| 2025/0285348 A1* | 9/2025 | Cantrell | ................ | G06F 16/345 |
| 2025/0308117 A1* | 10/2025 | Kansy | .................. | G06N 3/0455 |

OTHER PUBLICATIONS

"GitHub—Illyasviel/ControlNet: Let us control diffusion models!", ControlNet, Retrieved on Dec. 10, 2024, pp. 1-27, Retrieved from https://github.com/Illyasviel/ControlNet.

"Home Storage Open Caching Node", SVTA, Retrieved on Dec. 10, 2024, pp. 1-6, Retrieved from https://www.svta.org/project/home-storage-open-caching-node/.

"How to Make People Look Younger in Films", Premiere Gal, Jul. 23, 2021, pp. 1-8, Retrieved from https://premieregal.com/blog/2021/7/23/anti-aging-filters-for-video-in-adobe-after-effects.

"IP-Adapter-FaceID", Hugging Face, Model card, Retrieved on Dec. 10, 2024, pp. 1-15. Retrieved from https://huggingface.co/h94/IP-Adapter-FaceID.

Farazdaghi, E. et al., "Backward face ageing model (B-FAM) for digital face image rejuvenation", IET Biom., vol. 6 Iss. 6, Sep. 26, 2017, pp. 478-486.

Inner Reflections AI, "[Guide] Adding IP-Adapter to Your Animations Including Batch Unfold—An Inner-Reflections Guide", Dec. 7, 2023, 1 page, Retrieved from https://civitai.com/articles/3194/guide-adding-ip-adapter-to-your-animations-including-batch-unfold-an-inner-reflections-guide.

Kemelmacher-Shlizerman, I. et al., "Illumination-Aware Age Progression", Proceedings of the IEEE Conference on Computer Vision and Pattern Recognition (CVPR), 2014, pp. 3334-3341.

Lanitis, A. et al., "Modeling the process of ageing in face images", Proceedings of the Seventh IEEE International Conference on Computer Vision, vol. 1, 1999, pp. 131-136.

Panis, G. et al., "Overview of research on facial ageing using the FG-NET ageing database", IET Biom., vol. 5, Iss. 2, Jun. 1, 2016, pp. 37-46.

Radford, A. et al., "Learning Transferable Visual Models From Natural Language Supervision", arXiv:2103.00020v1, Feb. 26, 2021, pp. 1-48.

Vipperla, R. et al., "Ageing Voices: The Effect of Changes in Voice Parameters on ASR Performance", EURASIP Journal on Audio, Speech, and Music Processing, vol. 2010, Article No. 525783 , Feb. 23, 2010, pp. 1-10.

Wilson, J. et al., "Voice Aging with Audio-Visual Style Transfer", arXiv:2110.02411v1, Oct. 5, 2021, 5 pages.

Ye, H. et al., "IP-Adapter: Text Compatible Image Prompt Adapter for Text-to-Image Diffusion Models", arXiv:2308.06721v1, Aug. 13, 2023, 16 pages.

* cited by examiner

Baseline 33 y.o.

De-aged 23 y.o.

Aged 40 y.o.

Aged 65 y.o.

Baseline 53 y.o.

De-aged 28 y.o.

De-aged 40 y.o.

Aged 65 y.o.

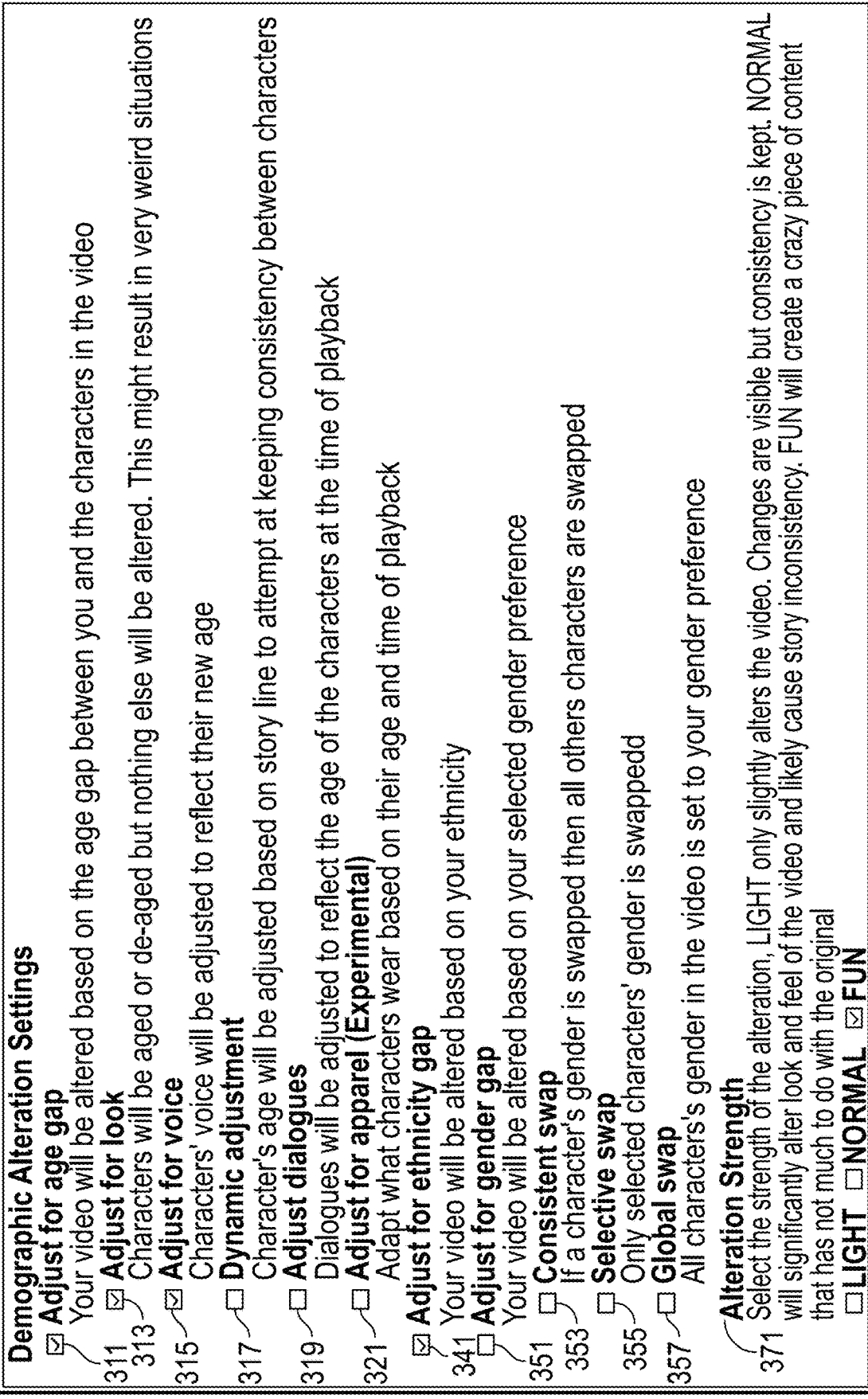

Demographic Alteration Settings

☑ Adjust for age gap — 311
  Your video will be altered based on the age gap between you and the characters in the video 313 — ☑ Adjust for look
  Characters will be aged or de-aged but nothing else will be altered. This might result in very weird situations 315 — ☑ Adjust for voice
  Characters' voice will be adjusted to reflect their new age 317 — ☐ Dynamic adjustment
  Character's age will be adjusted based on story line to attempt at keeping consistency between characters 319 — ☐ Adjust dialogues
  Dialogues will be adjusted to reflect the age of the characters at the time of playback 321 — ☐ Adjust for apparel (Experimental)
  Adapt what characters wear based on their age and time of playback ☑ Adjust for ethnicity gap — 341
  Your video will be altered based on your ethnicity ☐ Adjust for gender gap
  Your video will be altered based on your selected gender preference 351 — ☐ Consistent swap
  If a character's gender is swapped then all others characters are swapped 353 — ☐ Selective swap
  Only selected characters' gender is swappedd 355 — ☐ Global swap
  All characters's gender in the video is set to your gender preference

357

Alteration Strength — 371
  Select the strength of the alteration, LIGHT only slightly alters the video. Changes are visible but consistency is kept. NORMAL will significantly alter look and feel of the video and likely cause story inconsistency. FUN will create a crazy piece of content that has not much to do with the original

☐ LIGHT  ☐ NORMAL  ☑ FUN

Baseline Ethnicity

Altered Ethnicity #1

Altered Ethnicity #2

Altered Ethnicity #3

Ethnic Alteration of the Actress Ana De Armas and the Actor Daniel Craig

Altered Male #3

Altered Male #2

Altered Male #1

Baseline Female

Altered Female #3

Altered Female #2

Altered Female #1

Baseline Male

Sex Change for the Actress Ana De Armas and the Actor Daniel Craig

FIG. 10

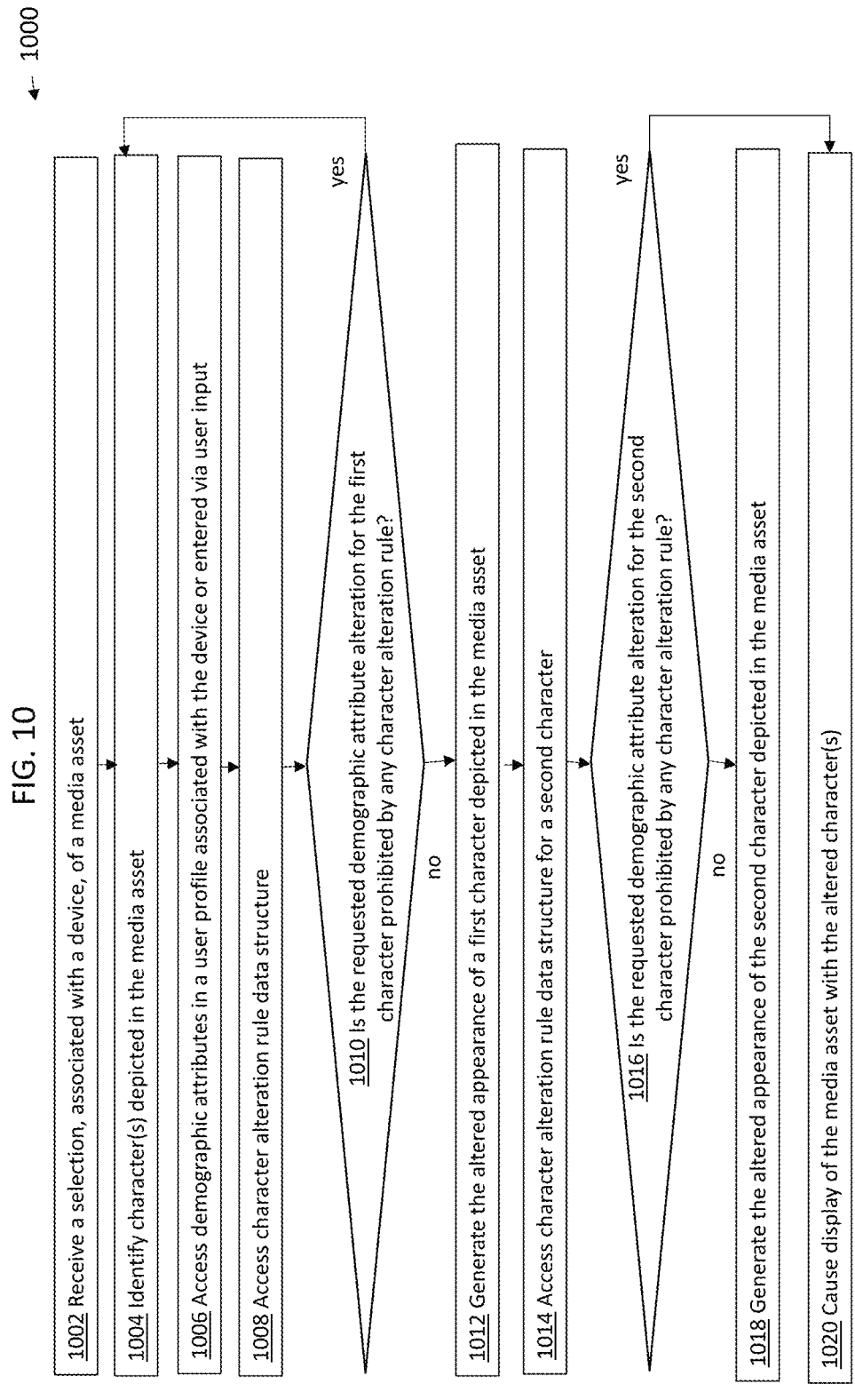

1000

1002 Receive a selection, associated with a device, of a media asset

1004 Identify character(s) depicted in the media asset

1006 Access demographic attributes in a user profile associated with the device or entered via user input 1008 Access character alteration rule data structure 1010 Is the requested demographic attribute alteration for the first character prohibited by any character alteration rule?

yes no

1012 Generate the altered appearance of a first character depicted in the media asset 1014 Access character alteration rule data structure for a second character 1016 Is the requested demographic attribute alteration for the second character prohibited by any character alteration rule?

yes no

1018 Generate the altered appearance of the second character depicted in the media asset 1020 Cause display of the media asset with the altered character(s)

SYSTEMS, METHODS, AND COMPUTER-READABLE MEDIA FOR PERSONALIZED MEDIA CONTENT ALTERATION

BACKGROUND

The present disclosure relates to the display of visual content and, more particularly, to generating personalized or customized characters in media content.

SUMMARY

A technological problem that arises with curating a library of available legacy media content, such as films, TV shows, short-form clips, or other video, is how to use technology to make the legacy media content more engaging by tailoring it to the needs or interests of individual users. Another technological problem is how to recommend media content so as to waste less server processing power and other network resources when rendering media content or webpages with unwanted media content recommendations.

Machine learning (ML) models that create avatars or realistic images are known. However, using such ML models to re-purpose legacy media for the preferences of individual users is a challenge. Also known are software applications that increase the size of fonts or choose different color palettes to increase accessibility for users. According to one approach, segments of content, such as a movie or a video game, can be replaced with other content, to make the overall content more palatable to a user or more accessible to a user with special needs.

A technological solution provided according to an aspect of the present disclosure is analyzing user preferences to increase user engagement with media content, such as a film, TV show, video clip, or other video, by altering the appearance of one or more characters in the media content, based on one or more demographic attributes of a user associated with a user device. In this way, embodiments of a system implementing aspects of the present disclosure may curate or provide media assets or other content that are more accurate or relatable for the target audience or user. Doing so may mitigate the problem of servers transmitting content that is unwanted by users and ultimately not consumed, and may thus conserve network bandwidth and reduce the use of network equipment and energy consumption. For example, a user device, such as a handheld device or other type of computing device of a user, or a server in communication with such a device, may store or retrieve indications of demographic attributes of a user associated with the handheld device or other type of computing device. Such demographic attributes may include the age of the uilser; an ethnicity of the user; sex or gender identification of the user; sexual preference of the user; images associated with the user, such as images of people known to the user; demographic attributes of friends or family of the user, pets, or other animals associated with the user; favorite actors, celebrities, or other personages associated with the user; and the like. For example, when a film is selected for viewing by a user or when more information about media content is requested by the user, the appearance of one or more characters depicted in the film may be altered (e.g., throughout the remainder of the content or for a portion thereof) using a trained ML model (and/or using other suitable computing techniques) based on such demographic attributes to render the media content to align more closely with the preferences of the user. In some embodiments, the altered character generated may be aligned with one or more corresponding demographic attributes of the user.

In some embodiments, user preferences may be analyzed to determine whether the user is likely to prefer depiction of one or more characters of a particular demographic. For example, the user's age, or approximate age, may be determined based on user profile information, such as user web browsing history, or the like, and it may be determined that the user prefers characters depicted as approximately his/her age. In this way, the age, ethnicity or other demographic factors may make characters depicted more likeable or relatable. Some such alterations may render one or more characters closer to the demographic of the user. Some such alterations may render one or more characters more distant from the demographic of the user. For example, it may be amusing to watch video clip of a party with everyone shown as elderly. In some embodiments, such a user demographic preference may be used as a trigger for commencing replacing the appearance of one or more characters in the media asset with the altered appearance of the one or more characters. Thus, in such embodiments, the system would generate the altered character appearance automatically only if such a user preference is identified.

In some embodiments, a lead character and a love interest are not re-aged by the same amount. The system may compute a demographic difference score between two or more characters in the video or media asset, which may be used to prevent a (re-)aged difference between some characters, for example, a lead character and a love interest, that exceeds a threshold. For example, if the lead character is altered to appear much younger, then the demographic difference score may be used in de-aging the love interest, accordingly. The demographic difference score may be used to constrain the re-aging of the characters to keep the storyline appealing and credible. By way of further example, the demographic difference score is used to ensure that a character appears older than another, e.g., consistent age appearance after the alteration. Thus, if a father appears older than a son in a movie, it is likely not credible, after the re-aging, for the father to look younger than the son.

A seed image may be used in conjunction with a prompt for generating one or more character appearances, according to some embodiments. The system may access such a seed image (e.g., selected based on user preferences), and then the system may generate embeddings based on the seed image as well as based on other input, e.g., text description, voice, etc. For example, the system may identify an actor depicted in the media asset and search for a photograph, sketch, painting and/or video at a younger age to be used as a seed image. The system may generate the altered character appearance to align it closer to the depiction, style of dress, overall character style, character era, color scheme, demographic factors, and/or the like depicted in the seed image. In this way, in some embodiments, a more specific target for the altered character may be provided.

In some embodiments, altered character appearances may be pre-cached to improve speed or performance of the display of the media asset. For example, it may be determined that a sports game broadcast, a video game, or a film has a target demographic of 18-26-year old males. In the case of a film, for purposes of illustration, the system may determine that a likely preference of the target demographic is a James Bond character in his late 20s. In such embodiments, an appearance of the actor Daniel Craig de-aged accordingly may be pre-cached prior to user selection of a James Bond film or prior to display in a recommendation, such as a recommendation or advertisement rendered by a media guidance application. Or, ethnic demographic alterations to characters may be pre-cached as dictated by geographic marketing considerations. For example, if the media asset is marketed in some geographic regions, for example, in portions of Southeast Asia, then an appropriate leading character may be altered to have an appearance closer to the target demographic, and the altered character appearance may be pre-cached.

The storyline or other considerations may dictate or prohibit some types of character alterations in some embodiments. For example, if the media asset depicts a romantic or intimate relationship between two characters, then the system may prevent alteration of a character that would result in the depiction of a minor. Metadata transmitted with or in association with the media asset may convey such restrictions or an ML model that generates altered characters may be trained to avoid such alterations. A trained ML model may compile a data structure indicating relationships between characters, character age thresholds, and/or character ethnic requirements based on the storyline, for example, based on the dialogue in the media asset and/or based on accessing one or more databases about contents of the media asset. The system may prevent alteration of an appearance of a character depicted in the media asset as a grandparent such that the grandparent would be depicted as being the same age as a grandchild. The ML model that generates the altered character(s), which may be the same or a different ML model than the ML model that compiles the data for the data structure, may access data contained in such a data structure to constrain some types of alteration. For example, such a data structure may indicate relationships between characters in the media asset that may be used to prohibit a character looking like a minor or may be used to prohibit alteration of a character's ethnicity or racial appearance. In some embodiments, such metadata and/or the ML model may also prohibit some character alterations for legal reasons, such as copyright law and right of publicity.

Also contemplated are implementations in which a character is re-aged to keep up with the aging of the user over time. For example, a first time a user plays a videogame, one or more avatars or other characters, human or nonhuman, may have a more youthful appearance, and the system may keep track of the elapsed time over months or years as the user continues to play the videogame. Based on how much time elapses, the system may re-age the one or more avatars or other characters accordingly. The system may prompt the user to request updating the character periodically to reflect the passage of time, or may periodically re-age the character automatically. A game that does not offer character customization may provide an API to adjust the appearance and other attributes of the character in the game to reflect a demographic preference.

Appearance, physical and other features, traits, including personality types and the like may sometimes be referred to herein as "features" or as "traits."

A method, system, non-transitory computer-readable medium, and means for implementing the method are disclosed for generating graphics. Such a method may include, for example: receiving a selection of a media asset, wherein the selection is associated with a device; identifying one or more characters depicted in the media asset; accessing one or more demographic attributes in a user profile associated with the device or entered via user input; determining a character alteration rule by accessing a data structure indicating one or more of: a character age parameter of the one or more characters; an ethnic parameter of the one or more characters; or a relationship between two or more characters of the one or more characters; generating an altered appearance of the one or more characters depicted in the media asset by altering, using one or more trained machine learning models, an appearance of the one or more characters depicted in the media asset based at least in part on the one or more demographic attributes and on the determined character alteration rule; and generating for display the media asset or a notification about the media asset such that the media asset or the notification about the media asset comprises the altered appearance of the one or more characters depicted in the media asset.

The generating of the altered appearance of the one or more characters depicted in the media asset may also entail: altering the appearance of a first character of the one or more characters based at least in part on the one or more demographic attributes, such that the altered appearance of the first character reflects a target demographic; and altering the appearance of a second character depicted in the media asset based at least in part on the target demographic. For example, the apparent age difference between the altered appearance of the first character and an unaltered depiction of the first character in the media asset is a first age difference, and wherein the apparent age difference between the altered appearance of the second character and an unaltered depiction of the second character in the media asset is a second apparent age difference, and the second apparent age difference is not equal to the first apparent age difference. In such an implementation, the second apparent age difference may be proportional to the first apparent age difference.

The method may also entail retrieving a reference image of at least character of the one or more characters depicted in the media asset. In such a case, the generating of the altered appearance of the one or more characters depicted in the media asset may include providing as input the reference image to the one or more trained machine learning models.

Also, based on the user profile associated with the device, the system may determine a user preference for an altered character appearance of a first demographic type. In this way, the generating the altered appearance of the one or more characters depicted in the media asset may be based at least in part on the user preference for the altered character appearance of the first demographic type.

In this method, the data structure may be generated based at least in part on metadata associated with the media asset. Further, the data structure may be generated by the one or more trained machine learning models.

The generating of the altered appearance of the one or more characters depicted in the media asset may entail determining an ethnic appearance of the one or more characters depicted in the media asset. To do perform this determining, a character alteration rule may be determined based at least in part on a storyline of the media asset. The character alteration rule may prohibit or prevent altering the ethnic appearance of the one or more characters. For example, the character alteration rule may be determined based at least in part on a storyline of the media asset, and the rule may set an age threshold for re-aging the one or more characters.

Other aspects and features of the present disclosure will become apparent to those of ordinary skill in the art upon review of the following description of specific embodiments in conjunction with the accompanying figures.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 3 illustrates an example of a graphical user interface demographic selection box that receives user settings for character alteration, in accordance with some embodiments of the disclosure;

FIG. 10 is a flowchart illustrating an example of a process for demographic feature-oriented character alteration, according to an example of an aspect of some embodiments of the present disclosure;

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION

Figure 1:
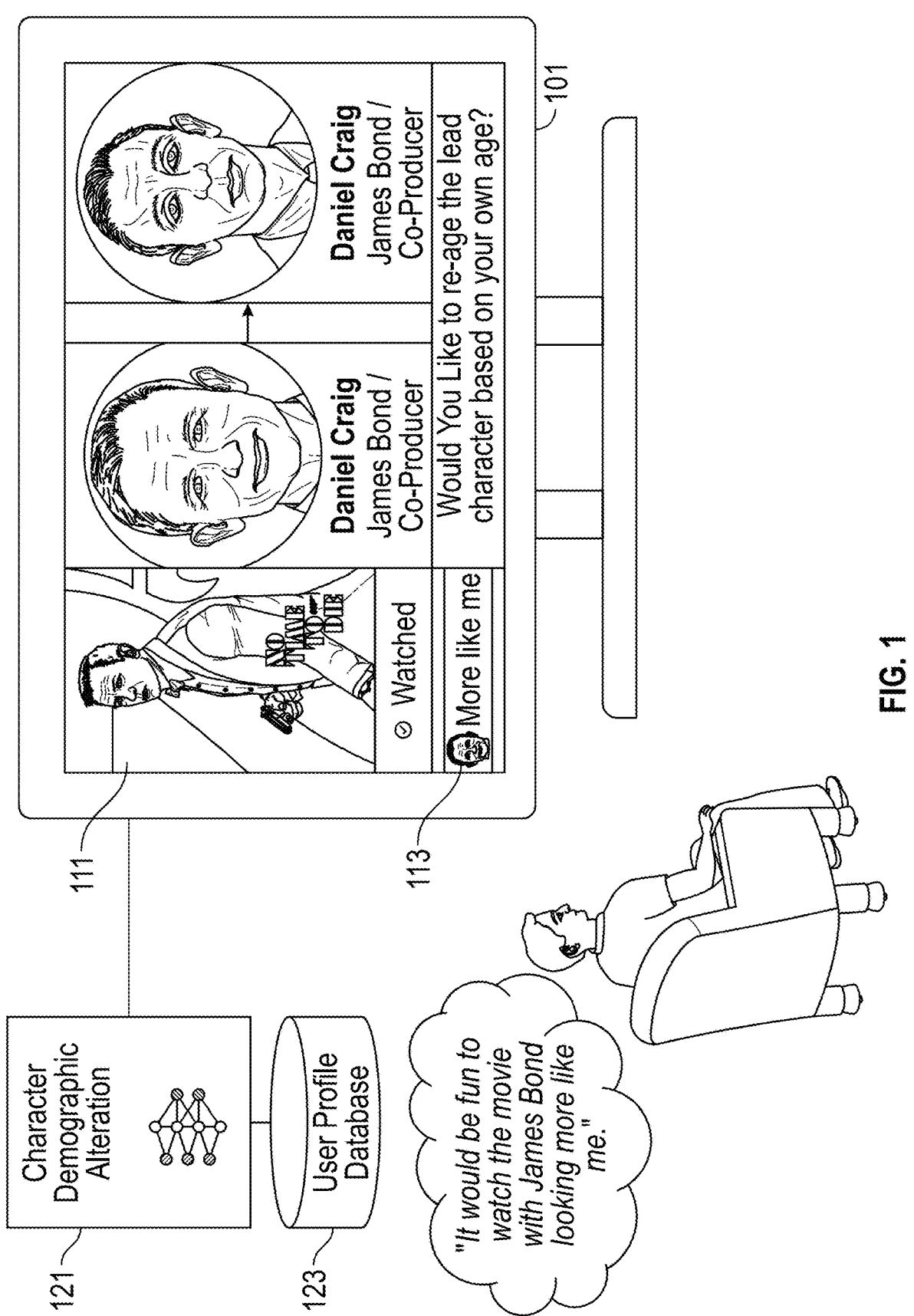
FIG. 1 illustrates an example of a character appearance alteration by re-aging a character depicted in the media asset based on user selection of a "more like me" setting before consuming the media asset, according to an example of an aspect of some embodiments of the present disclosure.

FIG. 1 illustrates user selection of a setting to re-age a character depicted in a media asset based on his own demographic features. In the example illustrated, the user selects a "more like me" setting 113 when a user guide 111 displays on television set 101 an advertisement or poster for a media asset, in this example, the James Bond film "No Time to Die," in response to which he may be enabled to choose a younger version of the lead character for the viewing of the movie. Character alteration module 121, which may include one or more trained machine learning models for performing the character alteration of the selected character, may retrieve one or more user demographic attributes, such as age, from a user profile contained in a user profile database 123. Based on the user demographic attribute(s) retrieved, the character alteration module 121 may create a demographically altered character to be shown for the user in the movie.

FIGS. 2A-2H illustrate an example of an implementation in which an appearance of a character in a media asset, shown as, for example, a character in a James Bond film portrayed by the actress Ana de Armas is re-aged by a system according to attributes accessed in a user profile. "Re-aged" may sometimes mean de-aged (made younger) or made older. A user profile may be a data structure accessed by the system (e.g., on a server or database or on user equipment), may be stored online (e.g., by a media platform that streams the media asset, a social network platform, or other third-party server that collects user information) and/or may be user information that is collected from a variety of sources. The system may prompt the user to enter his/her own demographic information or to enter other target demographic attributes of his/her own choosing for one or more characters of the media asset.

The system or media platform configured to perform the functionalities (or one or more portions thereof) described herein may be executed at least in part at one or more client devices (e.g., 800, 801 of FIG. 8) and/or at one or more remote servers (e.g., media content source 902 and/or server 904 of FIG. 9) and/or at any other suitable computing device(s); as part of any suitable platform or application, or any other suitable software and/or hardware components; or any combination thereof.

Figures 2A, 2B, 2C, 2D, 2E, 2F, 2G, 2H:
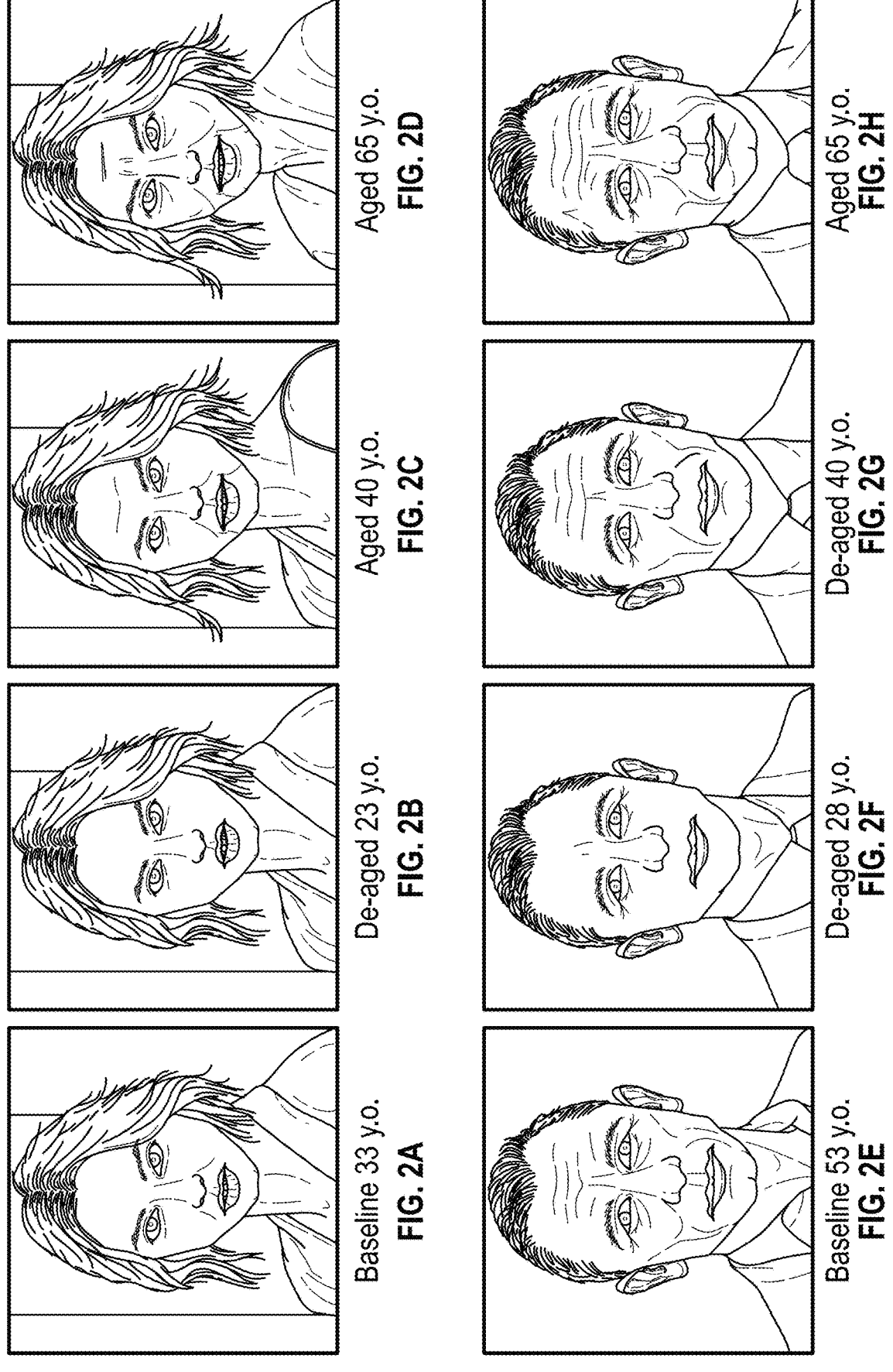
FIGS. 2A-2D illustrate examples of character appearance alteration by re-aging a character depicted in the media asset, according to an example of an aspect of some embodiments of the present disclosure.
FIGS. 2E-2H illustrate examples of character appearance alteration by re-aging another character depicted in the media asset, according to an example of an aspect of some embodiments of the present disclosure.

The appearance of the actress shown in FIG. 2A may be re-aged from a baseline age of 33 years old (the actress's age at the time the movie was made) to look younger, as shown in FIG. 2B, or older, as shown in FIG. 2C (40 years old) and FIG. 2D (65 years old). Similarly, the appearance of the character James Bond, portrayed by the actor Daniel Craig, may be re-aged from a baseline age of 53 years old to look younger, as shown in FIG. 2F (age 28) and 2G (age 40), or older, as shown in FIG. 2H (age 65). A media asset may comprise one or more movies or other films, television shows, video clips, audio clips, video games, or the like, or a combination of two or more of the foregoing. In some embodiments, the term "media asset" should be understood to refer to any of the following: an electronically consumable media assets, e.g., live content, television programming, as well as pay-per-view program, on-demand programs (as in video-on-demand (VOD) systems), Internet content (e.g., streaming content, downloadable content, webcasts, etc.), augmented reality content, extended reality content, augmented reality content, virtual reality content, three-dimensional content, video clips, audio, playlists, websites, articles, electronic books, blogs, social media, applications, video games, and/or any other media or multimedia, and/or combination of the above.

In an implementation, metadata for each media asset transmitted with or accessed in association with the media asset may include data indicating year of production, a list of one or more of the characters or of one or more of the cast members, date of birth or age of one or more of the characters or of one or more of the cast members, face and body identification for one or more of the characters or of one or more of the cast members, geographic or national origin of one or more of the characters or of one or more of the cast members, ethnic or cultural self-identification of one or more of the characters or of one or more of the cast members, gender expression of one or more of the characters, and/or other demographic information. Such metadata may have been provided by the content owner (such as a studio in the case of a movie) or may have been generated or determined as part of an ingestion workflow by a media platform, or a combination of both. In some embodiments, metadata for a media asset may indicate certain rules in relation to permissible changes to age or ethnicity or other characteristics based on a relationship of those characteristics to a plot or storyline of the media asset, e.g., a rule may indicate that the actress of FIGS. 2A-2D plays a romantic interest of James Bond, and thus cannot be below a minimum age (e.g., 18). As another example, the rule may indicate that the race or ethnicity of a character must be, e.g., Native American, if the storyline indicates that such character having an appearance as a Native American is integral to the plot in a story about Native Americans (e.g., in order to be historically accurate) or would otherwise conflict with the plot or storyline of the media asset.

The system may provide to a user an option to selectively alter the demographic profile of one or more cast members, or of all the cast members appearing in the media asset, for example, to close the gap between the demographic profiles of the characters in the media asset and the demographic profile of the user. The age parameter is discussed in the following example to illustrate the demographic alteration process, but alterations of other demographic parameters are also contemplated. Illustratively, a user may be 25 years old and ready to watch the James Bond movie "No Time to Die" or a clip thereof. The media platform at the server side or user equipment, or a combination of one or more servers and user equipment, may compute a demographic difference between the highest-ranking cast member for this video program (Daniel Craig) and the user. The system may rank (e.g., at the interface shown in FIG. 4) characters appearing in a media asset by order of importance to the story (e.g., measured by their time on-screen or based on the plot) and/or by their connectedness to each other. That information may also be acquired through metadata provided by the original content producer (e.g., the movie studio) or generated during content ingestion by the system. Metadata may also be crowdsourced, for example, from social media commentary, third-party platforms hosting information about media assets or performers, media asset reviews, other internet content, AI/ML models that analyze the media asset or other media assets in which the performers of the present media asset are also depicted, and the like.

Continuing with the James Bond movie example, the character James Bond, played by Daniel Craig, may be ranked first, and the character played by Léa Seydoux (Madeleine) may be ranked second due to both her connection to the main character, James Bond, and her time present on screen. Other characters, such as Paloma (played by Ana de Armas) or M (played by Ralph Fiennes) may be ranked lower than Madeleine. Continuing with this example, that difference is 53 years (age of Daniel Craig's James Bond character) minus 25 years (the apparent age of the re-aged Daniel Craig shown in FIG. 2F, which equals 28 years. The system may then apply image alteration algorithms (e.g., one or more machine learning models or any other suitable computer-implemented technique) to de-age Daniel Craig by about 28 years in each of the frames in which he appears, so that he matches more closely with the age group of the user. In some embodiments, inputs to such one or more machine learning models may include, e.g., a demographic score, a storyline of the media asset, character relatedness to other characters, character importance to the storyline and/or to the user, or any other suitable data, or any suitable combination thereof. The system may also alter other characters appearing in the media asset, for example, in the order of their ranking for the media asset. The system may limit the alteration to the first, or to the first few cast members, according to the ranking list, or the system may alter all cast members. For example, the appearance of the character M may be left unchanged.

In some implementations, the system may compute a demographic difference score between two or more of the characters in the video program. That demographic difference may be formulated as a distance in a vector space of the demographic characteristics that the media platform manages. For example, the media platform may consider at least the following characteristics as relevant for demographic personalization: age, binary gender, and skin tone. In this vector space, James Bond (Daniel Craig) is represented by the vector [53, 0, (217,122,88)] with 53 the actor's age at the time the movie was made, 0 for male (1 for female) and (217,122,88) being the RGB coordinate of a tan, white person. Paloma (Ana de Armas) is represented by vector [33,1, (252,219,212)]. A demographic distance (DD) may be computed by component for instance using the following formula:

$$DD(James, Paloma)=[53-33,|0-1|, sqrt((217-252)2+$$
$$(122-219)2+(88-212)2)]=[20,1,161]$$

Other formulas are possible. For example, the function used to compute the demographic distance or difference does not have to be a true mathematical distance such as a Euclidian distance. The media platform may adjust or weight the demographic difference between two characters based on their ranking in the media program by the media platform.

In some embodiments, a data structure may comprise rules that determine the manner in which demographic data about characters may be changed in the demographic alteration process. Such rules may be included in media asset metadata, e.g., manually added by the content provider, or otherwise determined using computer-implemented techniques. For example, one or more machine learning models may receive as input key terms from a plot summary or synopsis of the media asset and, based on such input, output an indication of which characteristics of characters' appearances are permitted (or not permitted) to be changed, and/or to what extent the change is permissible (e.g., an acceptable age range, or acceptable alternative ethnicities for certain characters). In some embodiments, a rule may dictate that one or more characters may not be altered to be a minor less than 18 years old, or less than 21 years old. A rule may dictate that an appearance of any character depicted or implied by the plot to be involved in a sexual relationship or depicted in a nude scene is not permitted to be altered to an appearance of a minor. A rule may dictate that one or more characters may not be altered to one or more designated ethnicities, or the rule may dictate that the ethnicity of one or more characters may not be altered. A rule may dictate that one or more characters may not be demographically altered. A rule may dictate that one or more characters may be demographically altered only by de-aging but not by making the character appear older. A rule may dictate that one or more characters may be ethnically altered but not re-aged. A rule may dictate that one or more characters may be re-aged but not ethnically altered. A rule may dictate that one or more characters may be ethnically altered and re-aged but not be depicted as being a different gender. Other such rules may also be specified, as will be understood. The data structure may be contained in metadata transmitted with or in association with the media asset, or may be accessed online.

The system may alter the age of characters in a nonlinear fashion (e.g., pursuant to re-aging rules contained in the data structure), based on the demographic difference between cast members and the first ranking cast member in the video program to avoid de-aging or aging a cast member too much, in some embodiments. Continuing with this example, having de-aged Daniel Craig by 25 years, if Ana de Armas were also de-aged by 25 years, she would appear on screen as an 8-year-old. This may be deemed to be detrimental to the viewing experience. Instead (e.g., pursuant to re-aging rules contained in the data structure), the re-aging alteration may depend on the individual demographic difference between each cast member and the viewer. In that case, de-aging Ana de Armas would be computed by her age difference with the user (e.g., 33–25=8 years). The media platform may limit the amount of de-ageing and ageing it applies to a character based on the initial age component of the demographic vector for that character. So, in the previous example, Ana de Armas may not be de-aged by more than 10 years, so the media platform may make her appear like she is 23 while Daniel Craig would appear 28.

Re-aging may be indexed according to the original demographic difference between the lead character and other characters, in some implementations. In the example above, Daniel Craig is de-aged by 28 years, resulting in him looking 25 years of age. If the same formula is applied to all cast members, it would result in all cast members appearing 25 on screen. In some implementations, the system may proportionally re-age a cast member based on his or her initial age difference with Daniel Craig. In such implementations, if Daniel Craig is de-aged to look like a 28-year-old, Ana De Armas is de-aged to say, 20-years-old to maintain consistency between age differences between altered characters and original characters. In another example, in a movie that features a father and a son, the alteration of the father may be limited (e.g., pursuant to re-aging rules contained in the data structure) due to the presence of a son. Similarly aging the son may have an impact on how the father is aged.

According to another approach, re-aging may be dynamic. The media platform may have received or generated metadata indicating that one or more of the characters' ages vary throughout the media program and may then dynamically alter the one or more character's age throughout the media program. For instance, in the movie "Gandhi," actor Ben Kinsley plays the character of Gandhi from his mid-20s all the way to his death at 78. In that particular case, the media platform may limit (e.g., pursuant to re-aging rules contained in the data structure) the age gap reduction to only certain segments of the media program. The system, for example, one or trained ML models, may identify segments in the media program where the age of the character targeted for age alteration is stable and may rank these segments by overall duration. The system may then decide to focus the age alteration effect to the segments ranking first and proportionally adjust the age of the targeted character in the other segments.

In some embodiments, re-aging of a character may be consistent throughout media assets in which the character appears, e.g., in relation to a user or a user profile. For example, having re-aged Daniel Craig to 28 years old in the media asset "No Time to Die" in a consumption session of a user, Daniel Craig may be similarly re-aged to appear 28 years old in a different James Bond movie watched by that user. The system may store in memory the age to which Daniel Craig was re-aged for the first media asset, or may store an image of the re-aged Daniel Craig from the first media asset, which stored image may be used as a seed image for re-aging him in the second media asset to be watched or being watched by the user. Or, the re-aging for the second media asset may be updated according to how much older the user is compared with when the user watched the first media asset. For example, if the user was 25 when the user watched the "No Time to Die" with Daniel Craig re-aged to age 28 and now the user is 30, then for watching the second media asset Daniel Craig may be re-aged to 33.

In some implementations, a user may bring demographic attributes of one or more characters closer to those of another user. For example, a first user may identify for the system a second user on a social network and request that the system re-age or alter other demographic attributes of one or more characters of a media asset based on the demographic attributes of the second user. The first user may then wish to send the media asset (or a link thereto) with the altered demographic attributes of the one or more characters to the second user, or may wish to consume the media asset together with the second user. By way of further example, if two users are playing a video game together, the first user may wish to make his avatar appear more like himself (e.g., re-age and/or alter ethnicity and/or gender) while the second user may wish to make his avatar appear more like himself (e.g., re-age and/or alter ethnicity and/or gender).

The visual alterations may be of faces of characters and/or of other body parts. The system may generate consistent human bodies, not just old faces on top of young bodies or vice versa. In implementations in which bounding polygons are extracted during the content ingestion, character's' body parts, such as chest, arms, legs, feet or hands, may also be marked.

The system may alter other aspects of the media asset. For example, in addition to, or instead of, re-aging the appearance of a character, the system may alter the voice of that character (e.g., to reflect the character's re-aged appearance). In one approach, various voice parameters, such as, for example, fundamental frequency, jitter, shimmer, and harmonicity (and/or any other suitable parameters), which tend to change with age, may be analyzed. For example, research shows that fundamental frequency generally decreases with age, which may be artificially modified to mimic the aging effect on a voice. Techniques like the Pitch Synchronous Overlap and Add method (PSOLA) may be used for such modifications. Another approach utilizes generative adversarial networks (GANs) for style transfer, similar to those used in image processing for aging faces. This approach, termed Voice Aging Neural Network (VANN), may transform voice samples by converting them into spectrogram images and applying style transfer to make the voice sound younger or older. This technique may aid the user to preserve identity of the character while altering the perceived age of the voice.

The system, such as a media platform, may provide a settings interface, as shown in FIG. 3, to control the type of alteration it applies to one or more media assets now or later streamed, downloaded or otherwise consumed, or a class or genre of media assets, or to all media assets, now or later streamed, downloaded or otherwise consumed by the user. The system may enable a user to set one or more aspects of demographic alteration settings using an interactive interface 300. Setting 311 may allow the user to adjust the age gap between one or more characters and the user. For example, setting 313 may enable the user to request adjusting the look of the character according to a re-aging. In some implementations, by default, these settings may allow the user to bring the demographic attribute selected for the character closer to that of the demographic attribute of the user. One or more other settings (not shown) may enable the user to input a preference for how much to de-age or by how much to make older the character. Setting 315 may enable the user to request re-aging the voice of one or more characters. In some implementations, by default, this setting would match re-aging of the character. Setting 317 may enable the user to request dynamic adjustments that alter one or more aspects of the plot of the media asset according to the re-aged character(s). Setting 319 may enable the user to adjust dialogue to reflect the re-aging of the character(s). Setting 321 may enable the user to adjust the apparel 321 to make the clothing, weapons, equipment or other accoutrements, vehicles and the like used by the character more consistent with the re-aging.

The "adjust for the ethnicity gap" setting 341 may enable the user to alter the ethnicity of one or more characters (e.g., to bring the character(s) closer to the ethnicity of the user), or to alter the ethnicity of some other ethnicity. The "adjust for gender gap" setting 351 may allow the user to alter the sex of the one or more characters.

Settings that provide finer control may also be provided. For example, setting 353 may enable the user to select a consistent gender swap to render characters' genders swapped according to the gender swap of a lead character or another character selected by the user. For example, if the user requests that the appearance of the lead heterosexual male character be swapped to female, then a love interest character of the lead character may be automatically changed to male. Selective swap setting 355 may request that only one or more target characters' gender is changed. A global swap setting 357 may be used to change the gender of all the characters in the media asset. Further, the gender may be set for each character selectively by the user. Alteration, strength 371 may be set to a light, normal or a fun setting. The light setting may cause the system to change the character in a visible and consistent way, but not too aggressively. For example, the appearance of the character may be changed to be more generally more youthful, brushed up, but not drastically made younger in way that calls for changes to demographic attributes of other characters, the storyline or the backstory of the character. A normal setting may significantly alter the look and feel of the appearance and other attributes of the at least one character, and may cause storyline inconsistency. The fun setting may create inconsistent media asset content that may alter the storyline and cause inconsistent character profiles to render an interesting or unpredictable universe for the media asset.

It will be understood that other such alteration strength settings and other such fine control settings may be provided for controlling one or more demographic attributes of characters in the media asset. For example, voice settings for changing the voice of a character that is being gender swapped may be provided; a dialogue setting for changing the dialogue and/or a dynamic adjustment setting for changing the storyline based on the gender change may also be provided. In a similar vein, a dialogue setting for changing the dialogue and/or a dynamic adjustment setting for changing the storyline based on the ethnic change may also be provided to render the ethnic change of the character more consistent and believable. By way of further example, an ethnic change may automatically entail changing the apparel or equipment used by the one or more characters whose ethnicity is changed. Also, in some implementations, an alteration strength setting may be provided separately for the re-aging, to enable the user to specify alteration strength for the re-aging, separately for the change in ethnicity, and separately for the change in gender. Also, the user may be enabled to select lighter alteration of age and/or ethnicity for one or more characters but stronger alteration of age and/or ethnicity for one or more other characters. A stronger alteration of the gender of the character to female may mean that the character appears or dresses in ways that are generally perceived as more feminine. A stronger alteration of the ethnic attributes of the character may mean that the character appears, dresses, or speaks (e.g., dialect and/or pronunciation and/or diction and/or accent) in ways that are more culturally distinctively consistent with the target ethnicity. In some embodiments, personality traits, mannerisms and/or formality/casual style of speech of the character may be altered to make them consistent with the new age, new gender and/or new ethnic background selected for the character. In some embodiments, the user may be enabled to select lighter alteration of age and/or ethnicity for one or more characters for a first portion of the media asset, or to select no alteration for the first portion, and to select stronger alteration of age and/or ethnicity for the one or more other characters for a second portion of the media asset.

Figure 4A:
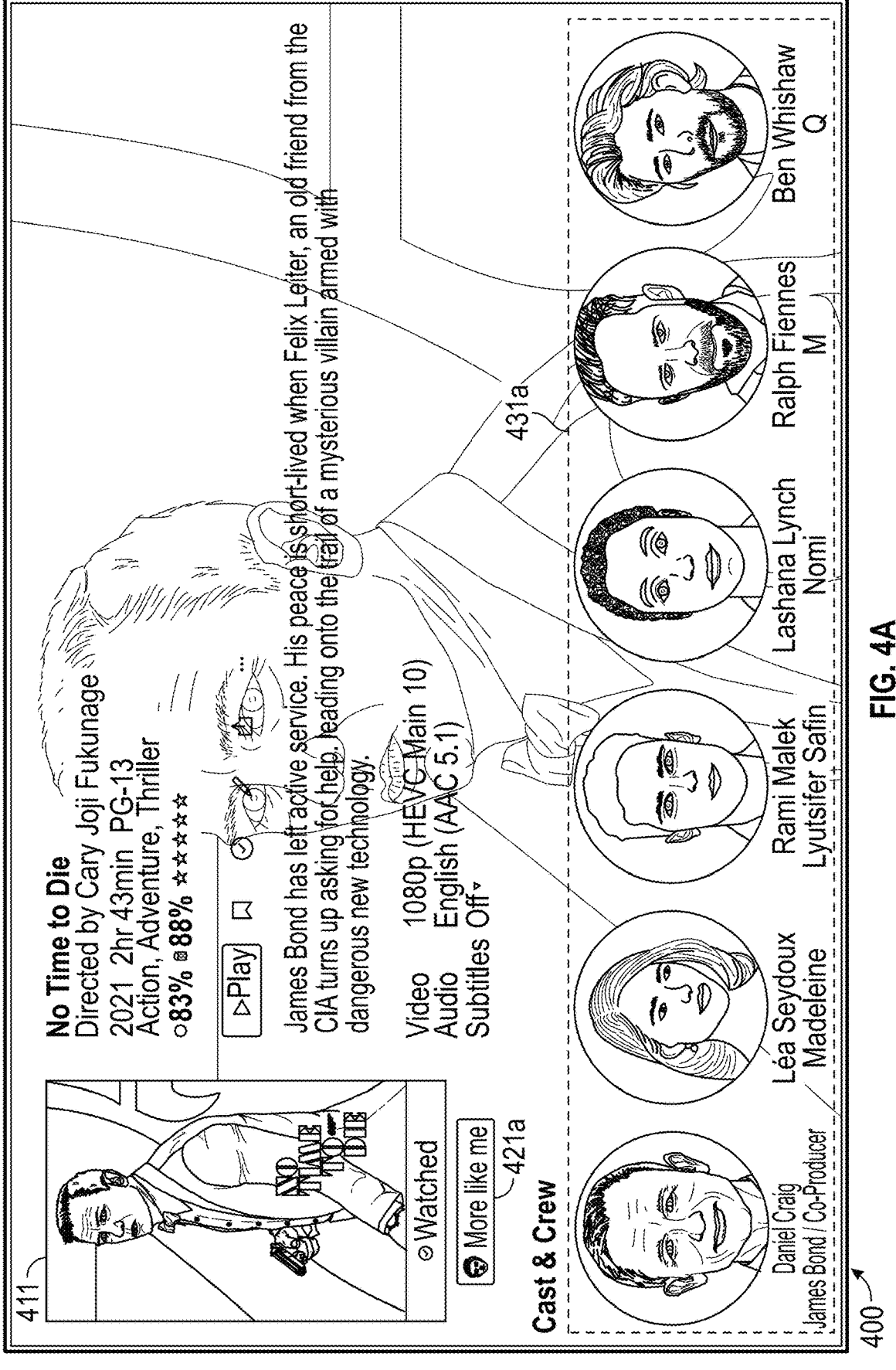
FIGS. 4A and 4B illustrate an example of a media guide or content recommendation for a media asset that enables user customization of character demographics, in accordance with some embodiments of the disclosure.

FIG. 4A illustrates a media guide page or a content recommendation 400 for a media asset 411, shown by way of example as the James Bond film "No Time to Die." The media asset recommendation 400 may include a "more like me" button 421a, which may enable a one-click user selection to change one or more characters of the media asset, for example, to re-age the one or more characters closer to the user and/or to bring one or more other demographic attributes of one or more characters closer to demographic attributes of the user. Thus, selection of the "more like me" button 421 may cause alteration of ethnic attributes and/or gender alteration of the one or more characters. Selection of the "more like me" button 421a may cause re-aging of the lead character, re-aging of the lead character and one or more love interests of the lead character, or of all the characters of the media asset 411 (e.g., in accordance with the setting shown in FIG. 3).

Cast crew selection 431 may allow the user to select one or more of the characters in the media asset 411 that the user wishes to re-age or for whom the user wishes to alter one or more other demographic attributes (e.g., ethnicity and/or gender). Cast selection 431 may allow the user to select two or more such demographic attributes. For example, user profile data may indicate that in the past, user has requested alteration of age, ethnicity and gender of characters, and thus selection of a character in the cast setting 431 may cause alteration of all three demographic attributes. Similarly, if user profile data indicates that in the past, the user has requested alteration of the age and ethnicity of characters, but not the gender, then selection of the "more like me" setting 421a may cause alteration of those two demographic attributes. The amount of age change, and the strength of the demographic change, may also be automatically determined based on user profile data. In some implementations, if a user selects demographic changes, such changes may be by default applied to the lead character and family members or romantic interests of the lead character but not to other characters. In some implementations, if a user selects the "more like me" button 421a, the system may provide the demographic alteration settings screen 300 (shown in FIG. 3) to enable the user to customize the one or more characters selected for alteration. Or, a separate screen (e.g., a pop-up window) may be provided to allow user selection of a "more like me" setting for the alteration of the character(s).

Figure 4B:
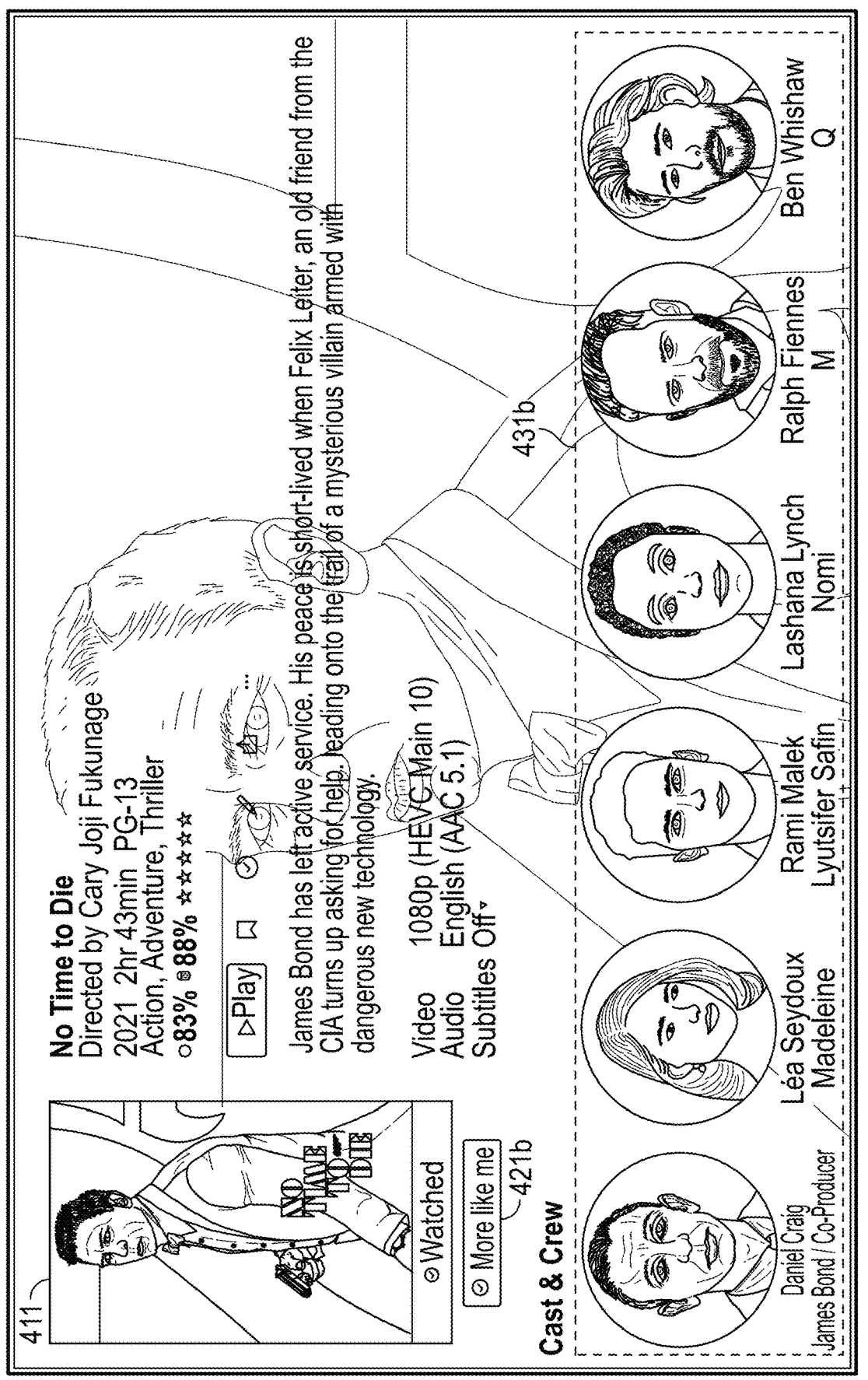
Figures 5A, 5B, 5C, 5D, 5E, 5F, 5G, 5H:
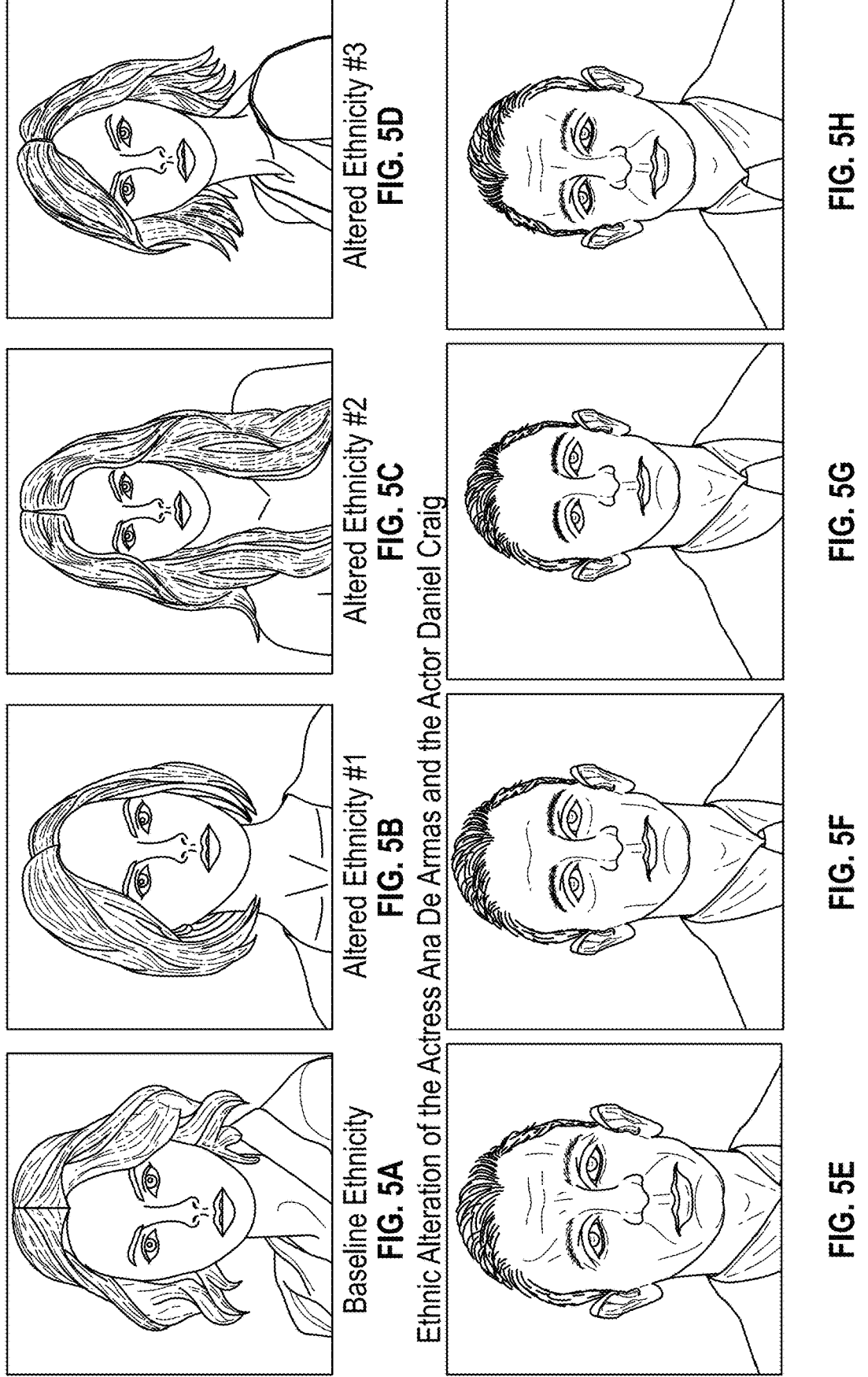
FIGS. 5A-5H illustrate examples of character appearance alteration by ethnic appearance change, in accordance with some embodiments of the disclosure.

In another example, the "more like me" feature may be available on a per cast member basis as opposed to globally for all or most cast members as illustrated in the figure above. Illustratively, the media guidance application may present a "more like me" widget under each cast member photo in the example of FIG. 4A, and upon activation show a check marked widget "more like you" as shown in FIG. 4B under the portrait of the cast members the user decided to personalize. In both figures above, the faded-out background image may also be personalized (not represented here).

FIG. 4B illustrates the media guide webpage or content recommendation 400 for the media asset 411 with the cast selection 431*b* showing the lead character re-aged. Other characters have remained unaltered. Setting 421*b* now states "more like you," indicating the altered lead character and also indicating that the alteration has rendered the character closer to demographic attributes of the user.

The re-aging or alteration of other demographic attributes may thus be applied automatically to the media guide webpage or content recommendation 400 in response to user request of alteration of the media asset 411. Depictions in movie posters or ads, movie trailers, and the like, as well as in the media guide webpage, or content recommendation, of characters altered in the media asset 411 may be automatically altered in the same way. In one implementation, during playback of the altered video program, the system may by default alter supplemental video programs, such as advertisements, trailers, future episodes previews, previously viewed episode recaps, and the like, using the same demographic parameters as for the main media asset. The system may, for example, schedule the download and alteration of the advertisement before an ad-break schedule and process them for demographic alterations in time for their scheduled ad-break. For example, after the user has requested re-aging Daniel Craig in "No Time to Die," the system may alter an ad for one or more other James Bond films starring Daniel Craig, or starring another actor playing James Bond, and push those ads to the user. The system may communicate with the advertisement network to ensure that these alterations are both permitted and adequately rewarded.

In another example, a media platform may limit the alteration options readily available to a viewer to a small portion of a media asset (e.g., a preview, trailer, or "last seen" recap of highlights in this series). This may allow the system to conserve resources and to avoid latency, which may be entailed in generating a large number of alterations for one viewer. Instead, the system may first alter key scenes of the media asset that may be selected based on crowd-sourced popularity or the tastes of the viewer as captured by the user's consumption on the media platform. Upon viewing the preview, a viewer may then be prompted or otherwise enabled to alter the whole media program. If the user selects the entire media asset for alteration, the system may then perform the actual alteration and notify the viewer when the altered content is ready. In another approach, the media platform may delegate the generation of the altered content to an edge compute resource available to the viewer. For example, a video service platform may provide its subscriber with a home server to facilitate the delivery of certain services. A home device such as a Home Storage Open Caching Node (HS-OCN) may extend content delivery and content generation components into the home further improving quality of experience (QoE) and content personalization capabilities.

In some implementations, the system (e.g., the media platform server streaming video, a third-party media alteration service, or user home equipment) may keep copies of altered content and provide them as recommendations for its users. For example, similarly to directors' cuts, which are versions of a movie by the director of a movie that differ from the publicly released version of that movie, a media platform may allow an influencer or a celebrity to publish his or her altered version of a media program on the media platform. Users of the platform following that influencer or celebrity may be then offered that version for consumption as part of their media recommendations of the media platform. Viewers may also be able to share their altered version of a media program with their connections, allowing a better use of compute resources when similar content can be shared instead of fully re-generated. In a watch party setting for example, the media platform may offer for immediate playback, both the original version of a media program as well as one or more altered versions of the program previously generated by one or more of the participants in the watch party.

In another example, the system may allow several users to collaborate on the alteration of a media program. For instance, a first user may decide to alter the program to make Daniel Craig more like the first user, and a second user may then further alter the program to make Ana de Arnas more like the second user, resulting in a compound alteration that the system may run in one pass instead of two separate passes. By way of another example, a first user and a second user may both want to alter the same character: the first user wants to alter Daniel Craig to appear to be the age of the first user, while user B wants to alter Daniel Craig to have the appearance of an East-Asian person. The system would then generate in a single process an altered appearance of Daniel Craig appearing to be the age of the first user with an East-Asian look. Furthermore, the system may allow a third user to further alter, in a second alteration generation process, the altered media program generated by the first and second users in the first run and so on, allowing quasi-infinite alteration cycles.

As discussed, demographic parameters other than age may be used to drive content alterations. Such parameters, for example, may include ethnicity. The system may allow a user to alter a media asset based on their own ethnicity, as shown by way of example, in FIGS. 5A-5D for Ana de Arnas and in FIGS. 5E-5H for Daniel Craig.

For example, if a user is of East-Asian heritage, he or she may want to personalize a media asset to make cast members who look like her. In this case, the alteration may include first generating an altered image of a cast member to look more like an East-Asian person. A text-to-image generation model may be used to generate that first image, guided by the image of the cast member unaltered using control networks such as a "canny" control network that guides a generation along dominant lines of an image. This allows for the proportions of the new face to be consistent with the original face, and limits the visual artefacts generated during the video-to-video production. Control networks such as IP-adapter may be used but instead of using an aged or de-aged version of a cast member as a guiding image as explained for re-aging a cast member, the first image representing the ethnically altered cast member is used. This solution may allow consistent alteration and may avoid unwanted artefacts, such as only altering a skin tone, for example, which may result in the generation of unwanted "blackface" effects.

When altering ethnicity, and similarly to what was explained for re-aging above, the media platform may also alter the voice or speech of an altered cast member to reflect ethnicity. Platforms already exist to generate accented voices and may use similar methods as described for aging but with different control parameters (accent instead of age). This may allow for an accent transfer from one voice record to an altered voice record.

Another demographic parameter that may be used to guide media alteration is gender identity. The system may allow a user to alter a media asset based on the user's own gender identification or assignment, or based on arbitrary considerations, as shown by way of example, in FIGS. 6A-6D for Ana de Arnas and in FIGS. 7E-7H for Daniel Craig. In one example, a female version of a male cast member is created using a text-to-image generative model and used to guide the alteration in the video-to-video production. Control networks, such as an IP-adapter, may be leveraged to ensure consistency from frame to frame. As seen in FIGS. 6A-6D for Ana de Arnas and in FIGS. 7E-7H for Daniel Craig, some altered appearances appear more androgenous while some altered appearances are more distinctly masculine or feminine. In some embodiments, an alteration strength setting similar to alteration strength setting 371 for age, may be provided to enable the user to control a stronger alteration of the gender of the character or a weaker alteration to a more gender bender, amorphous appearance.

Figures 6A, 6B, 6C, 6D, 7A, 7B, 7C, 7D:
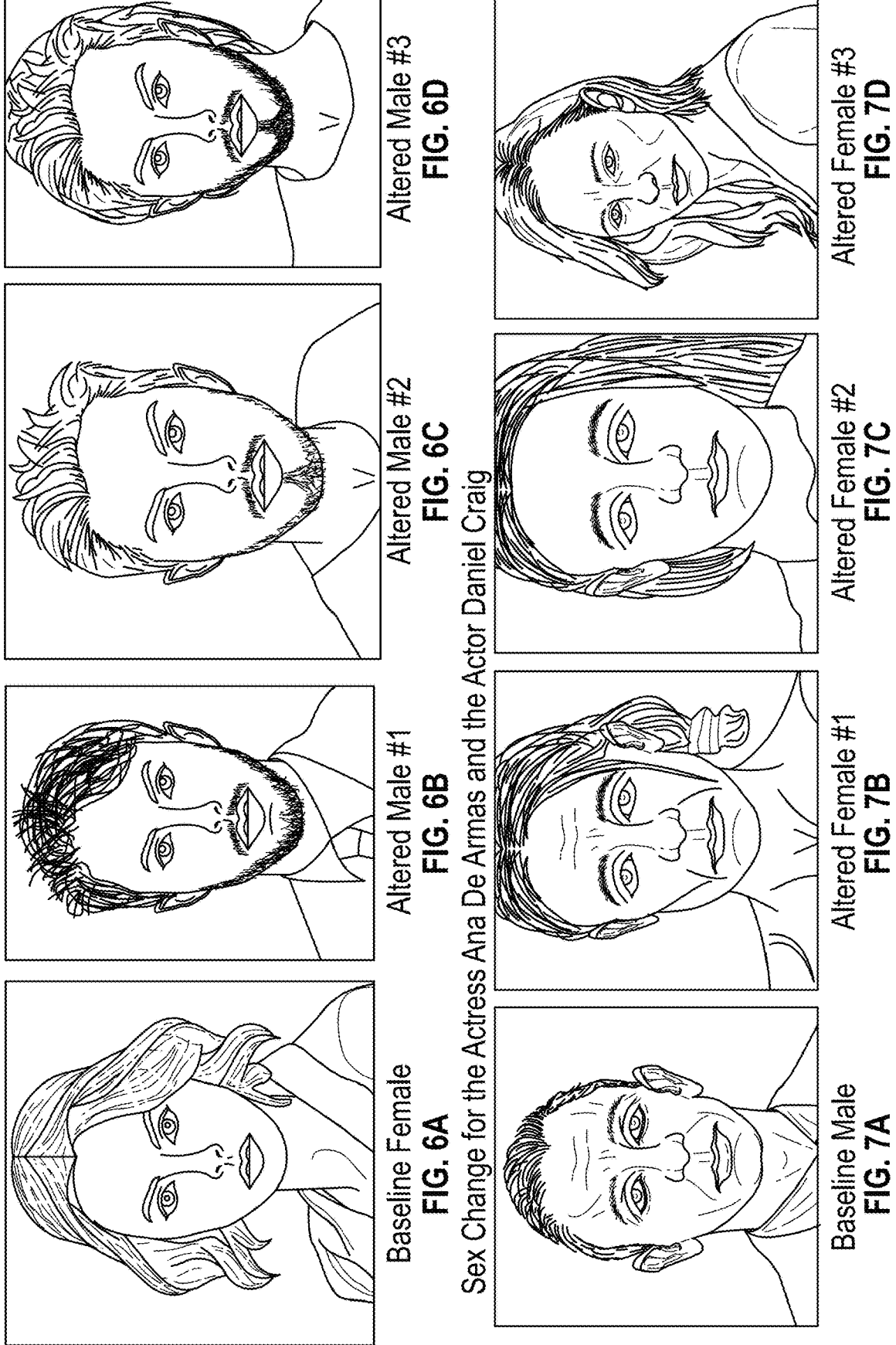
FIGS. 6A-6D and 7A-7D illustrate examples of character appearance alteration by gender change, in accordance with some embodiments of the disclosure.

Gender alteration may be requested on a per character basis or on a global media asset basis (e.g., all or substantially all characters get altered). When used globally on a media asset, the system may automatically alter all characters to a gender that is closer to the one described in the user's profile or they may maintain gender consistency based on the altered gender of the main character. In the James Bond example, if Daniel Craig is altered to look more like a female agent as illustrated in FIGS. 7B-7D, then Ana de Armas may be altered to look more like a male agent as illustrated in FIGS. 6B-6D.

Figure 8:
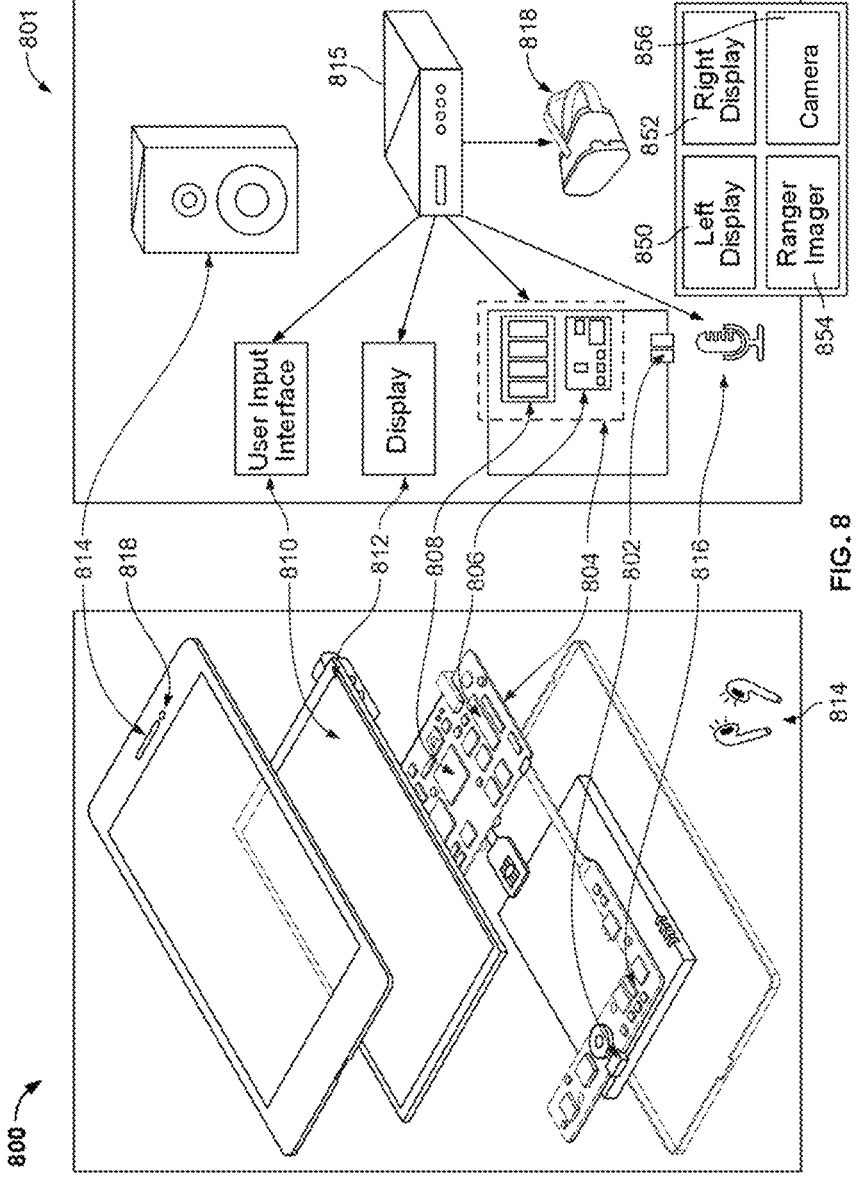
FIG. 8 illustrates a computer system for implementing methods described herein, according to an example of an aspect of some embodiments of the present disclosure.

FIG. 8 illustrates an example of generalized embodiments of illustrative user equipment devices 800 and 801, which may correspond to, e.g., computing devices 902, 911, 916, 907, 908, 910. For example, user equipment device 800 may be a smartphone device, a tablet, a virtual reality or augmented reality device, or any other suitable device capable of processing video data. In another example, user equipment device 801 may be a user television equipment system or device. User equipment device 801 may include set-top box 815. Set-top box 815 may be communicatively connected to microphone 816, audio output equipment (e.g., speaker or headphones 814), and display 812. In some embodiments, display 812 may be a television display or a computer display. In some embodiments, set-top box 815 may be communicatively connected to user input interface 810. In some embodiments, user input interface 810 may be a remote-control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 800 and user equipment device 801 may receive content and data via input/output (I/O) path 802 that may comprise I/O circuitry (e.g., network card, or wireless transceiver). I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. For example, set-top box 815 may be replaced by, or complemented by, a personal computer (e.g., a notebook, a laptop, a desktop), a smartphone, a tablet, a network-based server hosting a user-accessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i9 processor and an Intel Core i7 processor). In some embodiments, control circuitry 804 executes instructions for an application stored in memory (e.g., storage 808). Specifically, control circuitry 804 may be instructed to perform the functions discussed above and below.

In client/server-based embodiments, control circuitry 804 may include communications circuitry suitable for communicating with a server or other networks or servers. Applications described herein may be a stand-alone application implemented on a device or a server. Applications described herein may be implemented as software or a set of executable instructions. The instructions for performing any of the embodiments discussed herein may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a device 800.

In some embodiments, applications may be a client/server application where only the client application resides on device 800, and a server application resides on an external server. For example, applications may be implemented partially as a client application on control circuitry 804 of device 800 and partially on server 904 as a server application running on control circuitry 911. Server 904 may be a part of a local area network with one or more of devices 800 or may be part of a cloud computing environment accessed via the internet. In a cloud computing environment, various types of computing services for performing searches on the internet or informational databases, providing AR generation, providing storage (e.g., for a database) or parsing data (e.g., using machine learning algorithms described above and below) are provided by a collection of network-accessible computing and storage resources, referred to as "the cloud." Device 800 may be a cloud client that relies on the cloud computing capabilities from server 901, 904 to determine whether processing (e.g., at least a portion of virtual background processing and/or at least a portion of other processing tasks) should be offloaded from the mobile device, and facilitate such offloading. When executed by control circuitry of server, the application may instruct control circuitry to perform processing tasks for the client device and facilitate the character alteration.

Control circuitry 804 may include communications circuitry suitable for communicating with a server, edge computing systems and devices, a table or database server, or other networks or servers The instructions for carrying out the above mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein. Nonvolatile memory may also be used (e.g., to launch a boot-up routine and other instructions). Cloud-based storage may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of user equipment 800. Control circuitry 804 may also include digital-to-analog converter circuitry and analog-to-digital converter circuitry for converting between digital and analog signals. The tuning and encoding circuitry may be used by user equipment device 800, 801 to receive and to display, to play, or to record content. The tuning and encoding circuitry may also be used to receive video AR generation data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of user equipment device 800 and user equipment device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of device 800 and equipment 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. AR display device 818 may be any suitable AR display device (e.g., an integrated head mountain display or AR display device connected to a system 800). In some embodiments all elements of system 800 may be places into housing of the AR display device 818. In some embodiments, AR display device 818 comprises a camera (or a camera array) 856. Video cameras 856 may be integrated with the equipment or externally connected. One or more of cameras 856 may be a digital camera comprising a charge-coupled device (CCD) and/or a complementary metal-oxide semiconductor (CMOS) image sensor. One or more of cameras 856 may be an analog camera that converts to digital images via a video card. In some embodiments, one or more of cameras 856 may be dirtied at outside physical environment (e.g., two cameras may be pointed out to capture to parallax views of the physical environment). In some embodiments, one or more of cameras 856 may be pointed at user's eyes to measure their rotation to be used as biometric sensors. In some embodiments, AR display device 818 may comprise other biometric sensor or sensors to measure eye rotation (e.g., electrodes to measure eye muscle contractions). AR display device 818 may also comprise range image 854 (e.g., LASER or LIDAR) for computing distance of devices by bouncing the light of the objects and measuring delay in return (e.g., using cameras 856). In some embodiments, AR display device 818 comprises left display 850, right display 850 (or both) for generating VST images, or see-through AR images.

Applications used by system described herein may be implemented using any suitable architecture. For example, it may be a stand-alone application wholly-implemented on each one of user equipment device 800 and user equipment device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide functionality and preform any of the actions discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Figure 9:
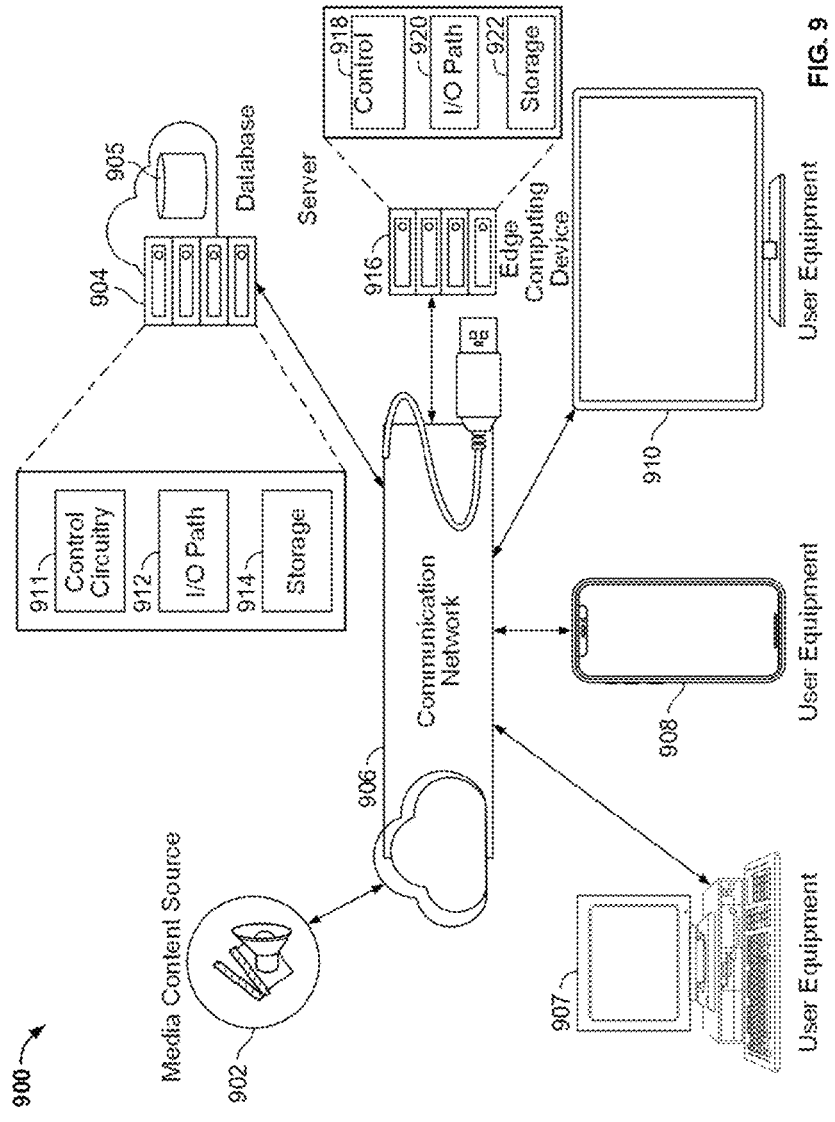
FIG. 9 is a diagram of an illustrative system for character alteration, according to an example of an aspect of some embodiments of the present disclosure.

FIG. 9 is a diagram of an illustrative system 900 for character alteration, in accordance with some embodiments of this disclosure. User equipment devices 907, 908, 910 (e.g., which may correspond to one or more of computing device 800 may be coupled to communication network 906. Communication network 906 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 906) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 906.

System 900 may comprise media content source 902, one or more servers 904, and one or more edge computing devices 916 (e.g., included as part of an edge computing system, such as, for example, managed by mobile operator). In some embodiments, the application may be executed at one or more of control circuitry 911 of server 904 (and/or control circuitry of user equipment devices 907, 908, 910 and/or control circuitry 918 of edge computing device 916). In some embodiments, a data structure may be stored at database 905 maintained at or otherwise associated with server 904, and/or at storage 922 and/or at storage of one or more of user equipment devices 907, 908, 910.

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide character appearance generation data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 911 executes instructions for an emulation system application stored in memory (e.g., the storage 914). Memory may be an electronic storage device provided as storage 914 that is part of control circuitry 911.

Edge computing device 916 may comprise control circuitry 918, I/O path 920 and storage 922, which may be implemented in a similar manner as control circuitry 911, I/O path 912 and storage 924, respectively of server 904. Edge computing device 916 may be configured to be in communication with one or more of user equipment devices 907, 908, 910 and video server 904 over communication network 906, and may be configured to perform processing tasks in connection with ongoing processing of video data. In some embodiments, a plurality of edge computing devices 616 may be strategically located at various geographic locations, and may be mobile edge computing devices configured to provide processing support for mobile devices at various geographical regions.

Various methods may be used to age or de-age cast members and/or to alter other demographic attributes. In one approach, a generative AI model, such as a text-to-image or text-to-video model may be used to generate one or more images or a video of a cast member "at a target age." For example, a media platform 904, using segmentation, may extract images of a cast member in multiple frames of a media program. It may then use these frames or images as guides in a video-to-video or image-to-image model and generate a prompt that adds "at age X" where X is the target age the media platform 904 has selected for that particular cast member based on the demographic difference computed above. Specialized generative AI models, such as IP-adapter models, allow for local generation of features in an image or video. Such models may be used during the alteration process in combination with a video-to-video model to ensure that there is consistent replacement of the elements selected for alteration in every frame of a video.

IP-adapter is a control network that may be further enhanced to focus on some features of an image or video frame. A text encoder for example, Contrastive Language-Image Pre-training (CLIP), or a custom implementation thereof, or any other suitable machine learning model or equivalent, may be replaced by a Face-ID encoder that deals with image embeddings, allowing the replacement of a face in an image or frame by another face based on that face embeddings in the face-ID space. IP-adapter is a lightweight adapter that may achieve image prompt capability for pre-trained text-to-image diffusion ML models. The IP-Adapter may leverage a decoupled cross-attention mechanism that separates cross-attention layers for text features and image feature.

The system may first identify characters depicted in the media asset. The media platform may for example, run semantic segmentation on video segments of a media asset to extract bounding polygons within each frame that are associated with body parts of a character. The media platform may generate polygons bounding a face of a character or the, or hands or legs of a character, or a combination of the foregoing. In some embodiments, metadata may be time-linked to the media asset so that each bounding polygon and its associated semantic object may be associated with a frame of the media asset.

The proposed IP-Adapter consists of two parts: an image encoder to extract image features from image prompt, and adaptation modules with decoupled cross-attention to embed image features into a pretrained text-to-image or image-to-image diffusion model. Other models may be built in a similar fashion to focus on other features or conditions such as other human body parts (hands, feet, legs, chest . . . ) or things like apparel (i.e., a style of clothing), equipment, accessories, that may be associated with a demographic metric.

While IP-adapter models were designed initially for image-to-image generation, inclusion of such models into video-to-video production workflows has been successfully demonstrated as illustrated. IP-adapter works by creating embeddings for a guidance image and using the guidance image in place of a text prompt in the text-to-image generation model. Such use of a guidance image may enable precise description post-text encoder of the intended result for the text-to-image models, allowing control over the end results and stability frame-to-frame in the case of a video workflow. At a high level, the text-to-image generation is, in effect, given a prompt analogous to "look at this image of a young Daniel Craig," instead of having to describe in words what a young Daniel Craig looks like. A character alteration may yield an altered character wearing apparel with a style that corresponds to the age, era and culture selected for the altered character.

The system may store or have access to a series of reference images to re-age a cast member. For example, actors with prolific career such as Robert de Niro, have their image recorded in movies from their younger age to their old age (De Niro was 20 when he filmed "The Wedding Party" and 80 in 2023's "Killers of the Flower Moon," and almost every age in every movie in-between). A media platform may use these images or videos to guide a video-to-video or image-to-video generative model to alter a media program to re-age (age or de-age) a cast member. An advantage of having historical data to guide the generation compared to just prompting the generation is that the altered face of a known actor would look like what viewers remember the person to have appeared like, as opposed to something artificially generated that may look like a younger version of that actor but not necessarily reflecting the reality of how that actor looked like younger. In some implementations, the user may be prompted to upload or to select in other ways such a seed image for use with the alteration. In some implementations, the seed image need not be of the same person as the character in the media asset. The system may then be prompted to alter the age and/or ethnicity and/or gender of the character in the media asset according to the seed image.

In yet another approach, a media asset, may have been generated using 3D rendering tools such as game engines. The content provider (i.e., the studio) may offer an application programming interface (API) to access 3D assets within the video program and alter them in a controlled way. For example, the media platform may allow the 3D model of an actor to be replaced by an altered version of this model. A media platform may then be able to request a re-rendering of the video program to include the altered 3D asset.

In an embodiment, the system may further alter the dialogue between the altered character and the other characters in the media program by adjusting the content of the dialogue to the altered age of the character. The media platform may first run the initial dialogue to a Large Language Model (LLM) and instruct it to generate a new dialogue of similar length but adjusted for the altered age of the character. For example, in the James Bond example, the villain Saffin (43-year old) says "We both eradicate people to make the world a better place. I just want it to be . . . tidier." Feeding that line to an LLM and asking it to rewrite it in the style of a 20-year old may lead to something like "We both cancel people to keep the world chill. I just want it to be . . . less messy." Upon receiving the altered dialogue, the media platform may now remap the characters' face to adjust for the new lip movements.

In some embodiments, the system may automatically select and propose the demographic alteration of the lead character and other characters based on a location of the user. For example, if the current user is located in Southeast Asia and is about to stream the media asset, play a trailer for the media asset or an ad, or access a user guide recommending the media asset, then the system may default to altering the lead character's ethnic appearance close to that of the user or may propose doing so. Or, the system may search for a prior user interaction with the system to determine whether the user has previously requested or usually requests such ethnic alteration.

A satisfaction level of the user with a previous demographic alteration may also be accessed to determine whether the system defaults to altering the one or more character's demographic attributes or proposes doing so. For example, if the user has previously requested ethnic alteration of the lead character to a target ethnicity and has been satisfied when consuming a first media asset, then the system may by default alter the lead character in a similar manner for the current media asset when consumed by the user, or the system may prompt the user to request such an alteration. Such user satisfaction may be determined based on user ratings of one or more previous media assets, one or more recommendations made by the user of one or more previous media assets, likes or thumbs up provided by the user for one or more previous media assets, and the like. In some implementations, such user satisfaction may be genre specific. Thus, if it is determined that the user prefers de-aging of the lead character and de-aging the lead character's love interests in action/adventure films, then the system may by default alter the lead character in a similar manner for the current media asset when consumed by the user, or may offer to do so but only if the current media asset is in the action/adventure genre.

FIG. 10 is a flowchart showing an example of a process 1000 for character alteration of demographic attributes according to character alteration rules. The process 1500 may be implemented, in whole or in part, by the systems shown in FIGS. 8 and 9 (e.g., control circuitry 911 of server 904 and/or control circuitry 804 of device 800, 801 of FIG. 8). One or more actions of the process 1000 may be incorporated into or combined with one or more actions of any other process or embodiments described herein. The process 1000 may be saved to a memory or storage (e.g., the storage of the system shown in FIGS. 8 and 9) as one or more instructions or routines, which may be executed by any suitable device or system having access to the memory or storage to implement the process 1000.

As shown at 1002, the system may receive a selection of a media asset from a device. For example, the user may select the media asset on a media streaming platform to learn more about the media asset. This may be a selection of a webpage about the media asset.

At 1004, the system may identify characters depicted in the media asset. According to some implementations, metadata for the media asset may list characters appearing in the media asset. At this time, the system may identify all the characters that are available for alteration and may present the list to the user. In some implementations, at this time, the user may request alteration of demographic attributes of one or more characters.

At 1006, the system may access demographic attributes in a user profile associated with the device. For example, the device may be a user device with which the user is interacting with the media streaming platform. Or the user may be prompted to enter aspects of his or her own demographic attributes, for example, the user's age.

At 1008, the system may access a character alteration rule data structure that contains rules specifying the type of alterations that are permissible. Different rules may apply to a first character than to a second character. In some implementations, rules may indicate how characters are allowed to be altered and no other alterations are permissible. In some implementations, rules may indicate how characters may not be altered and all other alterations are permissible. In some implementations, the system may prompt the user to request alteration of demographic attributes of one or more characters at this time.

At 1010, the system determines whether the requested character alteration for the first character is allowed or prohibited by the character alteration rules. If the character alteration requested is prohibited by any rule, then the system may return to 1004 to identify further characters, which may be selected for alteration. If no rule prohibits the character alteration (or in some embodiments, only if a rule specifically allows the character alteration), then at 1012 the altered appearance of the first character that was requested is generated. For example, the generation may be performed by one or more trained generative ML model(s). The generated appearance of the first character may be pre-cached so us to avoid or mitigate latency at streaming time. For example, the altered appearance of the character may be performed based on previous user alterations of this or similar characters. As discussed, other alterations, such as voice, attire, mannerisms, and the like may also be made.

At 1014, the character alteration rule structure may be accessed for any additional character for which character alteration has been requested. In some implementations, this may be performed in response to the user requesting alteration of demographic attributes of one or more additional characters.

At 1016, the system determines whether the requested attribute alteration for the second character is prohibited by any character or alteration rule, if it is prohibited, then the system proceeds to 1020. If no prohibition is determined, then the system may proceed to 1018 and the altered appearance of the second character requested is made.

At 1020, the altered characters are displayed. In some implementations, this may occur only as part of the playing of the media asset.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

Any use of a phrase such as "in some embodiments" or the like with reference to a feature is not intended to link the feature to another feature described using the same or a similar phrase. Any and all embodiments disclosed herein are combinable or separately practiced as appropriate. Absence of the phrase "in some embodiments" does not imply that the feature is necessary. Inclusion of the phrase "in some embodiments" does not imply that the feature is not applicable to other embodiments or even all embodiments.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be effected to the particular embodiments by those of skill in the art without departing from the scope of the present application, which is defined solely by the claims appended hereto. Throughout the specification, the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

What is claimed is:

1. A computer-implemented method comprising:
    receiving a selection of a media asset, wherein the selection is associated with a device;
    identifying one or more characters depicted in the media asset;
    accessing one or more demographic attributes in a user profile associated with the device or entered via user input;
    determining a character alteration rule by accessing a data structure indicating one or more of: a character age parameter of the one or more characters; an ethnic parameter of the one or more characters; or a relationship between two or more characters of the one or more characters, wherein the character alteration rule is based at least in part on a storyline of the media asset, and sets an age threshold for re-aging the one or more characters;
    generating an altered appearance of the one or more characters depicted in the media asset by altering, using one or more trained machine learning models, an appearance of the one or more characters depicted in the media asset based at least in part on the one or more demographic attributes and on the determined character alteration rule; and
    generating for display the media asset or a notification about the media asset such that the media asset or the notification about the media asset comprises the altered appearance of the one or more characters depicted in the media asset.

2. The method of claim 1, wherein the generating of the altered appearance of the one or more characters depicted in the media asset comprises:
    altering the appearance of a first character of the one or more characters based at least in part on the one or more demographic attributes, such that the altered appearance of the first character reflects a target demographic; and
    altering the appearance of a second character depicted in the media asset based at least in part on the target demographic.

3. The method of claim 2, wherein an apparent age difference between the altered appearance of the first character and an unaltered depiction of the first character in the media asset is a first apparent age difference, and
    wherein the apparent age difference between the altered appearance of the second character and an unaltered depiction of the second character in the media asset is a second apparent age difference, and the second apparent age difference is not equal to the first apparent age difference.

4. The method of claim 3, wherein the second apparent age difference is proportional to the first apparent age difference.

5. The method of claim 1, further comprising:
    retrieving a reference image of at least one character of the one or more characters depicted in the media asset,
    wherein the generating of the altered appearance of the one or more characters depicted in the media asset comprises providing as input the reference image to the one or more trained machine learning models.

6. The method of claim 1, further comprising:
    determining, based on the user profile associated with the device, a user preference for an altered character appearance of a first demographic type,
    wherein the generating the altered appearance of the one or more characters depicted in the media asset is based at least in part on the user preference for the altered character appearance of the first demographic type.

7. The method of claim 1, wherein the data structure is generated based at least in part on at least one of metadata associated with the media asset or using the one or more trained machine learning models.

8. The method of claim 1, wherein the determining the character alteration rule comprises accessing the data structure indicating the ethnic parameter of the one or more characters, and wherein the generating the altered appearance of the one or more characters depicted in the media asset comprises:
    determining an ethnic appearance of the one or more characters depicted in the media asset,
    wherein the character alteration rule prohibits altering the ethnic appearance of the one or more characters.

9. The method of claim 1, wherein the character alteration rule indicates at least one of the character age parameter or the relationship between the two or more characters, and the age threshold corresponds to the at least one of the character age parameter or the relationship between the two or more characters.

10. The method of claim 1, wherein the character alteration rule based at least in part on the storyline of the media asset is determined before the accessing of the data structure.

11. A system comprising:
    a memory; and
    control circuitry configured to:
        receive a selection of a media asset, wherein the selection is associated with a device;
        identify one or more characters depicted in the media asset;
        access one or more demographic attributes in a user profile associated with the device or entered via user input;
        determine a character alteration rule by accessing a data structure in the memory indicating one or more of: a character age parameter of the one or more characters; an ethnic parameter of the one or more characters; or a relationship between two or more characters of the one or more characters, wherein the character alteration rule is based at least in part on a storyline of the media asset, and sets an age threshold for re-aging the one or more characters;
        generate an altered appearance of the one or more characters depicted in the media asset by altering, using one or more trained machine learning models, an appearance of the one or more characters depicted in the media asset based at least in part on the one or more demographic attributes and on the determined character alteration rule; and generate for display the media asset or a notification about the media asset such that the media asset or the notification about the media asset comprises the altered appearance of the one or more characters depicted in the media asset.

12. The system of claim 11, wherein the generating of the altered appearance of the one or more characters depicted in the media asset comprises:

altering the appearance of a first character of the one or more characters based at least in part on the one or more demographic attributes, such that the altered appearance of the first character reflects a target demographic; and altering the appearance of a second character depicted in the media asset based at least in part on the target demographic.

13. The system of claim 12, wherein an apparent age difference between the altered appearance of the first character and an unaltered depiction of the first character in the media asset is a first apparent age difference, and wherein the apparent age difference between the altered appearance of the second character and an unaltered depiction of the second character in the media asset is a second apparent age difference, and the second apparent age difference is not equal to the first apparent age difference.

14. The system of claim 13, wherein the second apparent age difference is proportional to the first apparent age difference.

15. The system of claim 11, wherein the system is configured to:

retrieve a reference image of at least one character of the one or more characters depicted in the media asset, wherein the generating of the altered appearance of the one or more characters depicted in the media asset comprises providing as input the reference image to the one or more trained machine learning models.

16. The system of claim 11, wherein the system is configured to:

determine, based on the user profile associated with the device, a user preference for an altered character appearance of a first demographic type, wherein the generating the altered appearance of the one or more characters depicted in the media asset is based at least in part on the user preference for the altered character appearance of the first demographic type or using the one or more trained machine learning models.

17. The system of claim 11, wherein determining the character alteration rule comprises accessing the data structure indicating the ethnic parameter of the one or more characters, and wherein the generating the altered appearance of the one or more characters depicted in the media asset comprises:

determining an ethnic appearance of the one or more characters depicted in the media asset, wherein the character alteration rule prohibits altering the ethnic appearance of the one or more characters.

18. The system of claim 11, wherein the character alteration rule indicates at least one of the character age parameter or the relationship between the two or more characters, and the age threshold corresponds to the at least one of the character age parameter or the relationship between the two or more characters.

19. A computer-implemented method comprising:

receiving a selection of a media asset, wherein the selection is associated with a device;

identifying a first character depicted in the media asset and a second character depicted in the media asset;

accessing one or more demographic attributes in a user profile associated with the device or entered via user input;

determining a character alteration rule by accessing a data structure indicating one or more of: a character age parameter of the first character; an ethnic parameter of the first character; or a relationship between the first character and the second character; and generating an altered appearance of the first character by altering, using one or more trained machine learning models, an appearance of the first character based at least in part on the one or more demographic attributes and on the determined character alteration rule; and generating an altered appearance of the second character by altering, using the one or more trained machine learning models, an appearance of the second character based at least in part on the determined character alteration rule, wherein an apparent age difference between the altered appearance of the first character and an unaltered depiction of the first character in the media asset is a first apparent age difference, and wherein the apparent age difference between the altered appearance of the second character and an unaltered depiction of the second character in the media asset is a second apparent age difference, and the second apparent age difference is not equal to the first apparent age difference.

20. The method of claim 19, wherein the second apparent age difference is proportional to the first apparent age difference.

* * * * *